US010990623B2

(12) United States Patent
Liu et al.

(10) Patent No.: US 10,990,623 B2
(45) Date of Patent: Apr. 27, 2021

(54) INFORMATION RETRIEVAL METHOD, ELETRONIC DEVICE AND STORAGE MEDIUM

(71) Applicant: Beijing Xiaomi Mobile Software Co., Ltd., Beijing (CN)

(72) Inventors: Ming Liu, Beijing (CN); Liangxiong Wu, Beijing (CN); Baolin Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 239 days.

(21) Appl. No.: 15/721,736

(22) Filed: Sep. 30, 2017

(65) Prior Publication Data
US 2018/0046625 A1 Feb. 15, 2018

Related U.S. Application Data

(63) Continuation of application No. PCT/CN2016/095359, filed on Aug. 15, 2016.

(51) Int. Cl.
*G06F 15/16* (2006.01)
*G06F 16/48* (2019.01)
(Continued)

(52) U.S. Cl.
CPC ........... *G06F 16/48* (2019.01); *G06F 16/334* (2019.01); *G06F 16/951* (2019.01);
(Continued)

(58) Field of Classification Search
CPC ... H04L 29/08072; H04L 51/32; H04L 67/18; H04L 51/04; H04L 51/14; G06F 16/40;
(Continued)

(56) References Cited

U.S. PATENT DOCUMENTS 6,519,571 B1 * 2/2003 Guheen ................. G06Q 30/02
705/14.66
7,797,642 B1 * 9/2010 Karam ................. G06Q 10/107
345/419

(Continued)

FOREIGN PATENT DOCUMENTS

CN 101610163 A 12/2009
CN 101610164 A 12/2009
(Continued)

OTHER PUBLICATIONS

Extended European search report of European Patent Application No. 17183103.5, from the European Patent office, dated Oct. 12, 2017.
(Continued)

*Primary Examiner* — Khanh Q Dinh
(74) *Attorney, Agent, or Firm* — Jun He Law Offices P.C.; James J. Zhu

(57) ABSTRACT

An information retrieval method, an electronic device and a storage medium are provided. The method comprises: sending at least one keyword in chatting contents in an input box of an instant messenger to a server, when it is detected that the chatting contents need to be sent to a communication counterpart; receiving, from the server based on the at least one keyword, retrieved contents and at least one category in which the retrieved contents are categorically stored in the server; and categorically displaying the retrieved contents in a current interface, in accordance with the at least one category.

18 Claims, 21 Drawing Sheets

(51) Int. Cl.
*G06F 16/33* (2019.01)
*G06F 16/951* (2019.01)
*G06F 40/279* (2020.01)
*H04L 12/58* (2006.01)

(52) U.S. Cl.
CPC ............ *G06F 40/279* (2020.01); *H04L 51/04* (2013.01); *H04L 51/14* (2013.01)

(58) Field of Classification Search
CPC ...... G06F 16/279; G06F 16/48; G06F 16/334; G06F 16/951
USPC .......................... 709/203, 220, 224, 227, 228
See application file for complete search history.

(56) References Cited

U.S. PATENT DOCUMENTS

| | | | |
|---|---|---|---|
| 7,831,917 B1* | 11/2010 | Karam | G06Q 10/10 701/408 |
| 7,917,866 B1* | 3/2011 | Karam | G01C 21/20 455/567 |
| 8,171,424 B1* | 5/2012 | Karam | H04L 67/18 345/594 |
| 8,756,501 B1* | 6/2014 | Karam | H04L 51/32 715/700 |
| 10,171,598 B2* | 1/2019 | Chen | G06F 3/04817 |
| 10,193,986 B2* | 1/2019 | Zhang | G01C 21/3667 |
| 10,594,045 B2* | 3/2020 | Kirino | H01Q 13/0283 |
| 2005/0198124 A1* | 9/2005 | McCarthy | H04L 51/16 709/203 |
| 2011/0041084 A1* | 2/2011 | Karam | G06Q 10/10 715/753 |
| 2011/0178881 A1* | 7/2011 | Pulletikurty | G06Q 30/0241 705/14.73 |
| 2012/0096025 A1 | 4/2012 | Li et al. | |
| 2013/0144951 A1* | 6/2013 | Viswanath | H04L 67/2823 709/204 |
| 2014/0019884 A1* | 1/2014 | Dinan | H04L 12/1813 715/758 |
| 2014/0297712 A1* | 10/2014 | Karam | H04L 51/32 709/202 |
| 2015/0281145 A1 | 10/2015 | Ji | |
| 2016/0034977 A1 | 2/2016 | Bhaowal et al. | |
| 2016/0127486 A1* | 5/2016 | Chen | G06F 3/04842 709/206 |
| 2016/0259778 A1* | 9/2016 | Cookson | G06Q 10/107 |
| 2021/0011967 A1* | 1/2021 | Rathod | G06F 16/958 |

FOREIGN PATENT DOCUMENTS

| | | |
|---|---|---|
| CN | 102298627 A | 12/2011 |
| CN | 102955798 A | 3/2013 |
| CN | 103699619 A | 4/2014 |
| CN | 104917669 A | 9/2015 |

OTHER PUBLICATIONS

International search report of PCT/CN2016/095359, from the State Intellectual Property Office of China, dated Feb. 7, 2017.
The First Office Action in Chinese Patent Application No. 201680000760.X, dated Jul. 26, 2019.

* cited by examiner

INFORMATION RETRIEVAL METHOD, ELETRONIC DEVICE AND STORAGE MEDIUM

CROSS-REFERENCE TO RELATED APPLICATIONS

The present application is a Continuation of International Application No. PCT/CN2016/095359, filed on Aug. 15, 2016, the entire contents of which are incorporated herein by reference.

TECHNICAL FIELD

The present application generally relates to the technical field of information processing, and more particularly to an information retrieval method, an electronic device and a storage medium.

BACKGROUND

Typically, if a user wants to share contents retrieved by a search engine with a counterpart with whom he/she is chatting, the user needs to launch a browser, enter a link address of the search engine in the browser, and then enter, on the page of the search engine, a keyword for searching. After a search result is retrieved by the search engine based on the keyword, the user has to copy link addresses or contents on the page and then paste and send the link addresses or the contents on the page via an instant messenger so as to complete the sharing with his/her chatting counterpart.

SUMMARY

The present disclosure provides an information retrieval method, an electronic device and a storage medium.

According to a first aspect of the present disclosure, an information retrieval method is provided. The method comprises: sending at least one keyword in chatting contents in an input box of an instant messenger to a server, when it is detected that the chatting contents need to be sent to a communication counterpart; receiving, from the server based on the at least one keyword, retrieved contents and at least one category in which the retrieved contents are categorically stored in the server; and categorically displaying the retrieved contents in a current interface, in accordance with the at least one category.

According to a second aspect of the present disclosure, an electronic device is provided. The electronic device comprises: a processor; and a memory storing instructions executable by the processor. The processor is configured to: send at least one keyword in chatting contents in an input box of an instant messenger to a server, when it is detected that the chatting contents need to be sent to a communication counterpart; receive, from the server based on the at least one keyword, retrieved contents and at least one category in which the retrieved contents are categorically stored in the server; and categorically display the retrieved contents in a current interface, in accordance with the at least one category.

According to a third aspect of the present disclosure, there is provided a non-transitory computer-readable storage medium having stored therein instructions that, when executed by a processor of a mobile terminal, cause the mobile terminal to perform an information retrieval method, the method comprising: sending at least one keyword in chatting contents in an input box of an instant messenger to a server, when it is detected that the chatting contents need to be sent to a communication counterpart; receiving, from the server based on the at least one keyword, retrieved contents and at least one category in which the retrieved contents are categorically stored in the server; and categorically displaying the retrieved contents in a current interface, in accordance with the at least one category.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to certain exemplary embodiments, examples of which are illustrated in the accompanying drawings. The following description refers to the accompanying drawings in which the same numbers in different figures represent the same or similar elements unless otherwise indicated. The implementations set forth in the following description of embodiments do not represent all implementations consistent with the disclosure. Instead, they are merely examples of apparatuses and methods consistent with aspects related to the disclosure as recited in the appended claims.

Figure 1A:
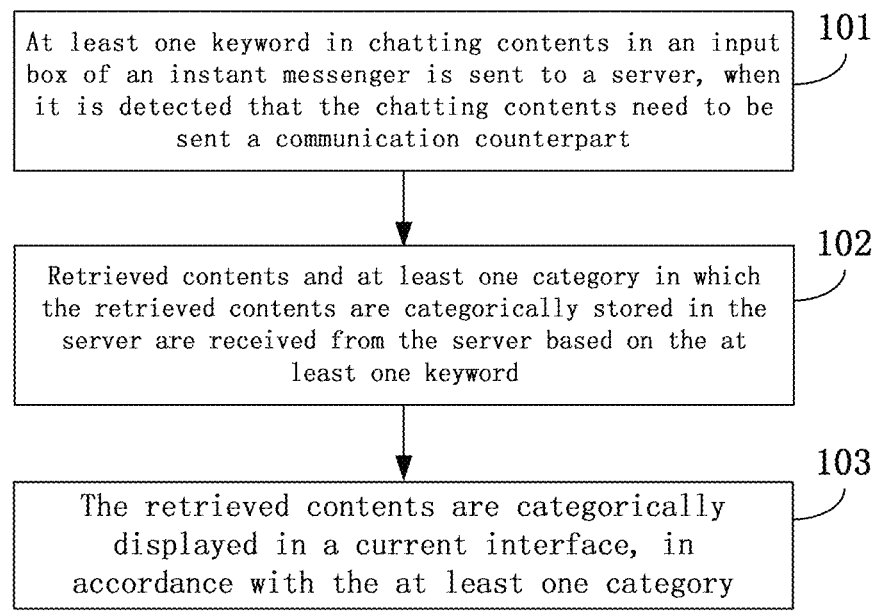
FIG. 1A is a schematic flowchart illustrating an information retrieval method according to an exemplary embodiment.
Figure 1B:
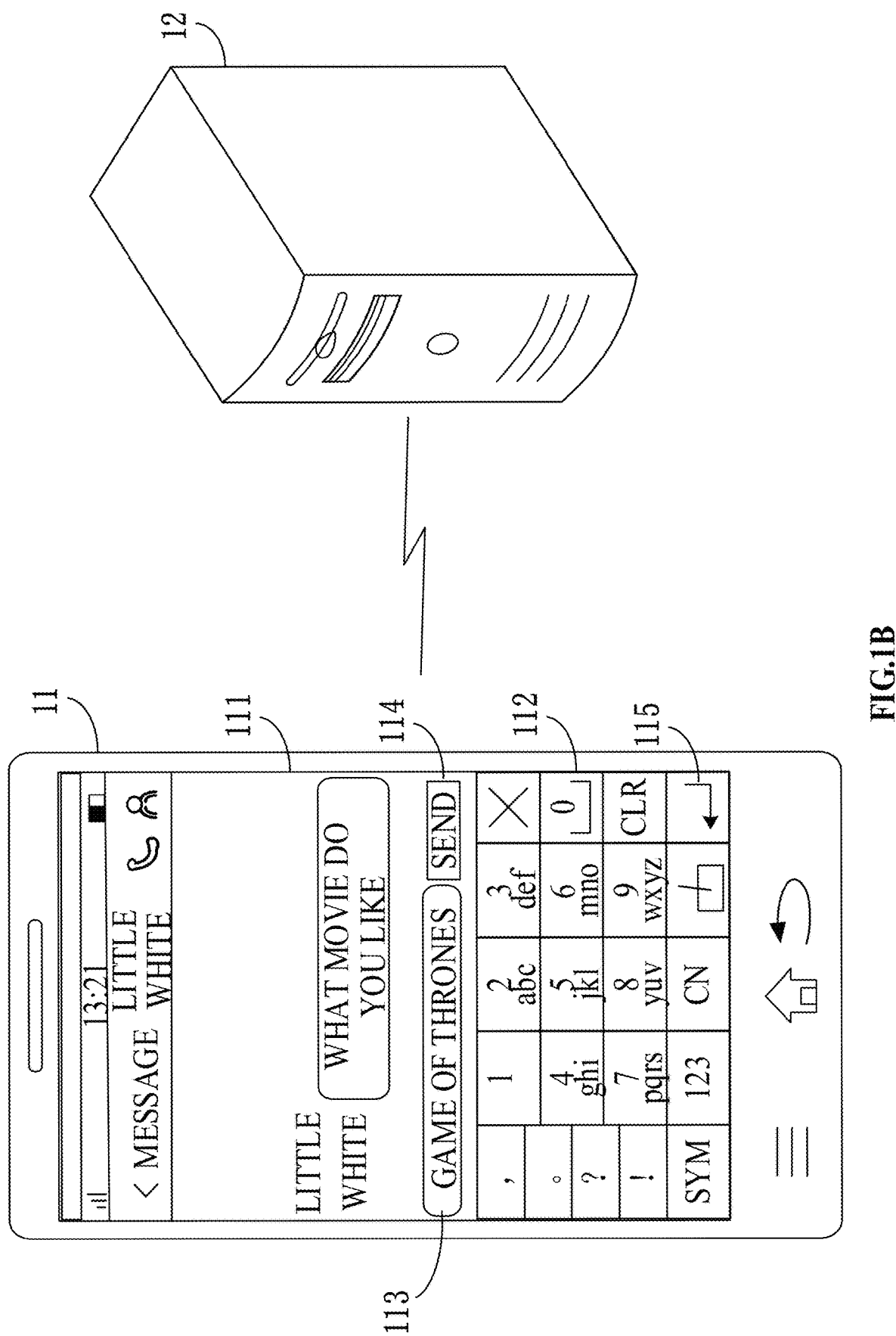
FIG. 1B is a diagram illustrating a scenario for an information retrieval method according to an exemplary embodiment.

FIG. 1A is a schematic flowchart illustrating an information retrieval method according to an exemplary embodiment. FIG. 1B is a diagram illustrating a scenario for an information retrieval method according to an exemplary embodiment. The information retrieval method may be used in an electronic device (e.g., a smart phone, a tablet PC, a personal computer or the like), and may be implemented by installing an instant messenger in the electronic device. As shown in FIG. 1A, the information retrieval method may comprise the following steps 101-103.

At step 101, at least one keyword in chatting contents in an input box of an instant messenger is sent to a server, when it is detected that the chatting contents need to be sent to a communication counterpart.

In an embodiment, an inputting method APP may determine whether chatting contents to be sent into an input box of a communication counterpart exist in an input box of an instant messenger, by interacting with the instant messenger. When chatting contents to be sent to the communication counterpart exist in the input box, the inputting method APP may identify textual information in the chatting contents to acquire at least one keyword in the chatting contents. In an embodiment, chatting contents may include textual information, and may also include an image. When textual information is included, keyword(s) in the textual information can be regarded as the at least one keyword in the present disclosure. When an image is included, key information of the image can be regarded as the keyword in the present disclosure. The key information of the image may be identified by the server or identified locally.

At step 102, retrieved contents and at least one category, in which the retrieved contents are categorically stored in the server, are received from the server based on the at least one keyword.

In an embodiment, the server may include multiple databases of different categories. Each database of a respective category stores information corresponding to the category. The categories may include video, audio, image, book, news, etc. The server may determine, from all categories in the server, at least one category corresponding to the at least one keyword, based on the at least one keyword, and then retrieve contents which match the keyword from at least one database corresponding to the at least one category. In an embodiment, the server may fetch latest contents from the Internet, and store the contents into respective databases of different categories according to their categories.

At step 103, the retrieved contents are categorically displayed in a current interface, in accordance with the at least one category.

In an embodiment, the retrieved contents may be displayed in a chatting interface of an instant messenger or in an inputting method interface corresponding to an inputting method APP. In an embodiment, when the retrieved contents are categorically displayed in the chatting interface or inputting method interface, it is possible to set a scroll bar on a side of the retrieving interface or inputting method interface, so that the instant messenger or inputting method APP can present, to the user, retrieved contents corresponding to respective categories by monitoring scrolling of the scroll bar. In another embodiment, it is possible to display retrieved contents of respective categories on multiple pages in the retrieving interface or inputting method interface, wherein each page may include retrieved contents corresponding to a category.

In an exemplary scenario, for example, the inputting method APP is a T9 (text on nine keys) inputting method APP. As shown in FIG. 1B, a user Simon is using an electronic device 11 to perform instant chatting with Little White (who may be considered as a communication counterpart in the present disclosure) via an instant messenger 111. After Little White sends a message "What movie do you like" to Simon, Simon enters "game of thrones" in an input box 113 of an instant messenger via a T9 inputting method 112. Then, the T9 inputting method 112 performs semantic recognition on textual information in the input box 113 to obtain "game of thrones" as keywords, and sends "game of thrones" to a server 12. The server 12 retrieves contents in databases of movie, audio and the like in accordance with "game of thrones", and returns to the electronic device 11 the contents retrieved in the server and at least one category corresponding to the retrieved contents. For example, a link address "http://v.qq.com/x/cover/54ntb912jygjxd7.html" and a "video" category corresponding to the link address are returned to the electronic device 11. The electronic device 11 may display retrieved contents in the current interface according to categories such as movie, audio and the like.

In this embodiment, during chatting between a user and a communication counterpart, by sending at least one keyword in chatting contents in an input box to a server and by displaying, in a current interface, retrieved contents retrieved by the server in accordance with the at least one keyword and categories corresponding to the retrieved contents, the retrieved contents are closely related to a topic of the chatting, because the at least one keyword is acquired based on the chatting contents in the input box at the user end. The retrieved contents enable the user to make direct access to the information he/she needs, thereby eliminating the need for switching from an instant messenger to a browser and then from the browser to the instant messenger. Thus, the user's instant chatting with the communication counterpart will not be interrupted when the user needs to search for information associated with chatting contents during the instant chatting.

In an embodiment, sending the at least one keyword in the chatting contents in the input box to the server when it is detected that the chatting contents need to be sent to the communication counterpart comprises: when it is detected that there are chatting contents entered in an input box of an instant messenger, identifying textual information in the chatting contents so as to acquire at least one keyword in the chatting contents; and sending the at least one keyword in the chatting contents to the server.

In an embodiment, the method may further comprise: detecting whether a trigger event for sharing of a retrieved content occurs in the current interface in which the retrieved contents are displayed categorically; and when it is detected that the trigger event for sharing of a retrieved content occurs, sending the retrieved content to be shared to the communication counterpart.

In an embodiment, categorically displaying the retrieved contents in the current interface in accordance with the at least one category comprises: categorically displaying the retrieved contents in an inputting method interface in accordance with the at least one category; or categorically displaying the retrieved contents in a chatting interface in accordance with the at least one category.

In an embodiment, categorically displaying the retrieved contents in the current interface in accordance with the at least one category comprises: acquiring a latest action keyword in a chatting record or in the chatting contents, when the at least one category is received from the server; determining a displaying order of the at least one received category based on the latest action keyword; and displaying, in the displaying order, the at least one category and the retrieved contents corresponding respectively to the at least one category.

In an embodiment, the method may comprise: determining the displaying order of the at least one category according to a preset displaying order, if it fails to acquire the latest action keyword in the chatting record or in the chatting contents.

In an embodiment, determining the displaying order of the at least one received category based on the latest action keyword comprises: determining a matching degree between the latest action keyword and each of the at least one category so as to acquire at least one matching result; determining the displaying order of the at least one category, in accordance with a descending order of the at least one matching result; and if the at least one matching result indicates that multiple categories have the same matching degree, determining a displaying order of the multiple categories with the same matching degree in the current interface according to a preset order.

In an embodiment, the method may further comprise: when it is detected that the chatting contents in the input box to be sent to the communication counterpart include an image, sending the image as the at least one keyword to the server; or identifying key information of the image, and sending the identified key information of the image as the at least one keyword to the server.

For details about how to implement an information retrieval, reference can be made to the following embodiments.

With the foregoing methods provided by embodiments of the present disclosure, retrieved contents are related closely to a topic of the chatting. The retrieved contents enable the user to make direct access to the information he/she needs, thereby eliminating the need for switching from an instant messenger to a browser and then from the browser to the instant messenger. Thus, the user's instant chatting with the communication counterpart will not be interrupted when the user needs to search for information associated with chatting contents in the input box during the instant chatting.

In the following, technical solutions provided by embodiments of the present disclosure will be described with reference to specific embodiments.

Figure 2A:
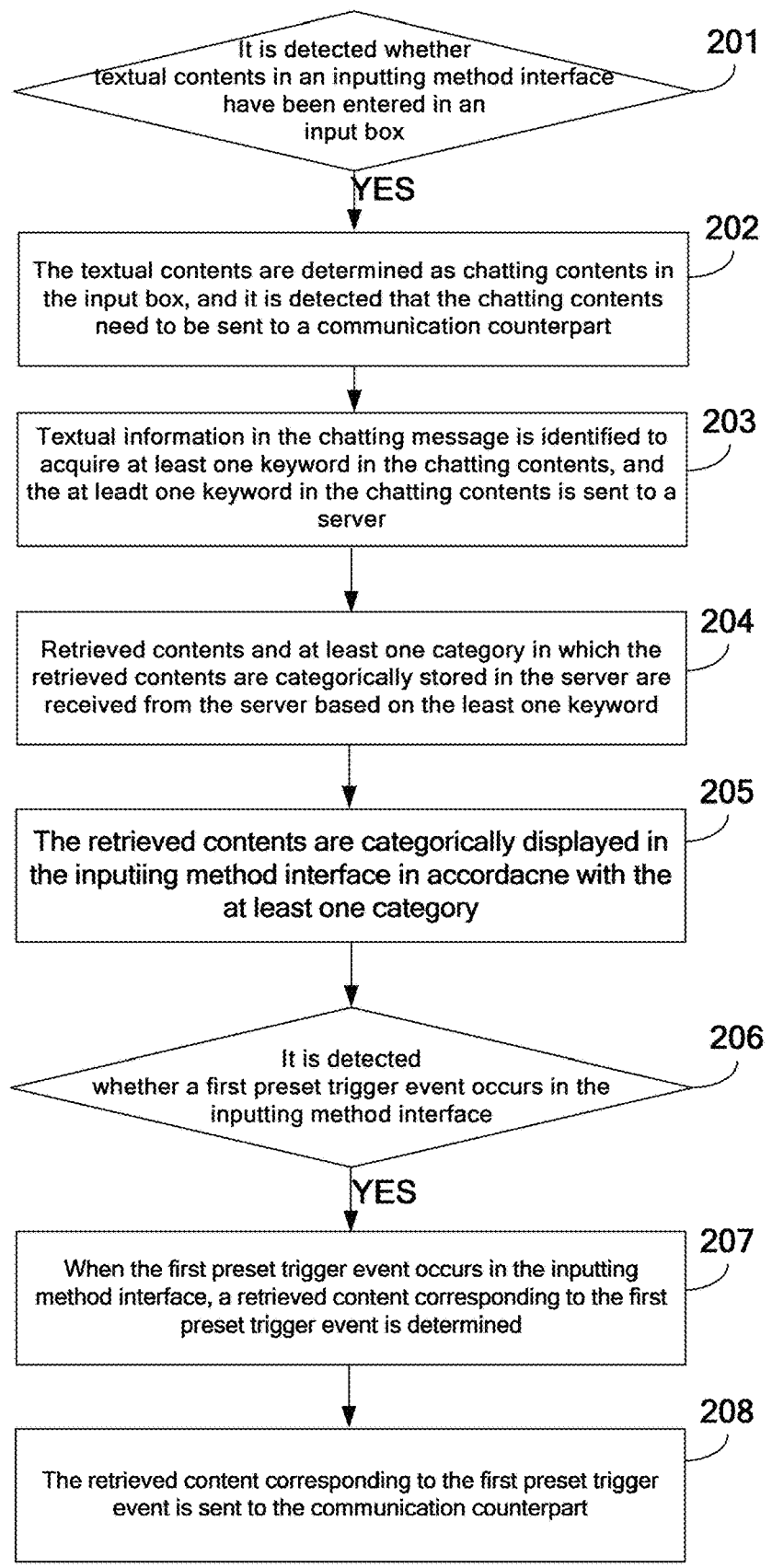
FIG. 2A is a schematic flowchart illustrating an information retrieval method according to an exemplary embodiment 1.
Figure 2B:
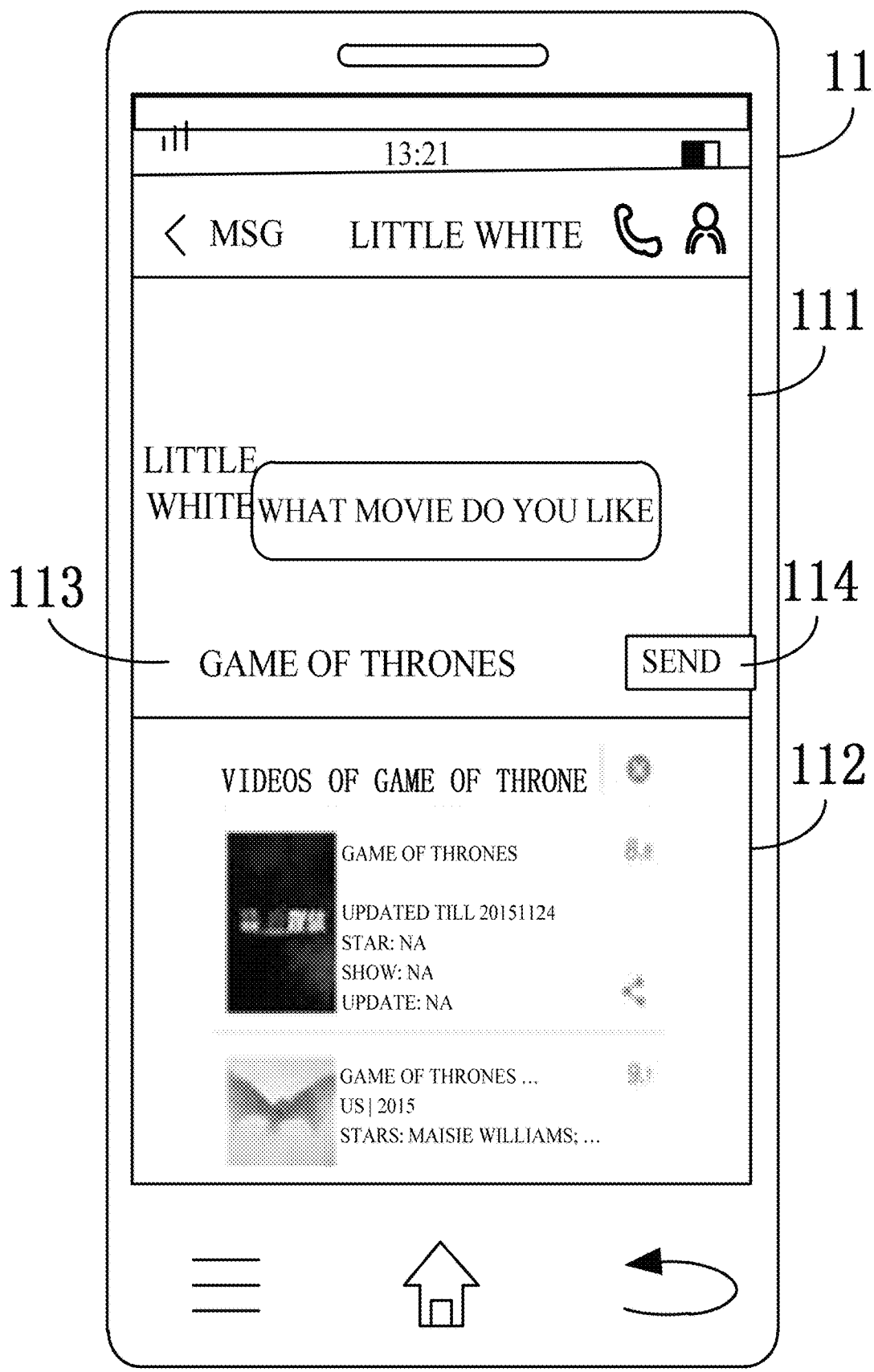
FIG. 2B is a diagram illustrating a scenario 1 for an information retrieval method according to the exemplary embodiment 1.
Figure 2C:
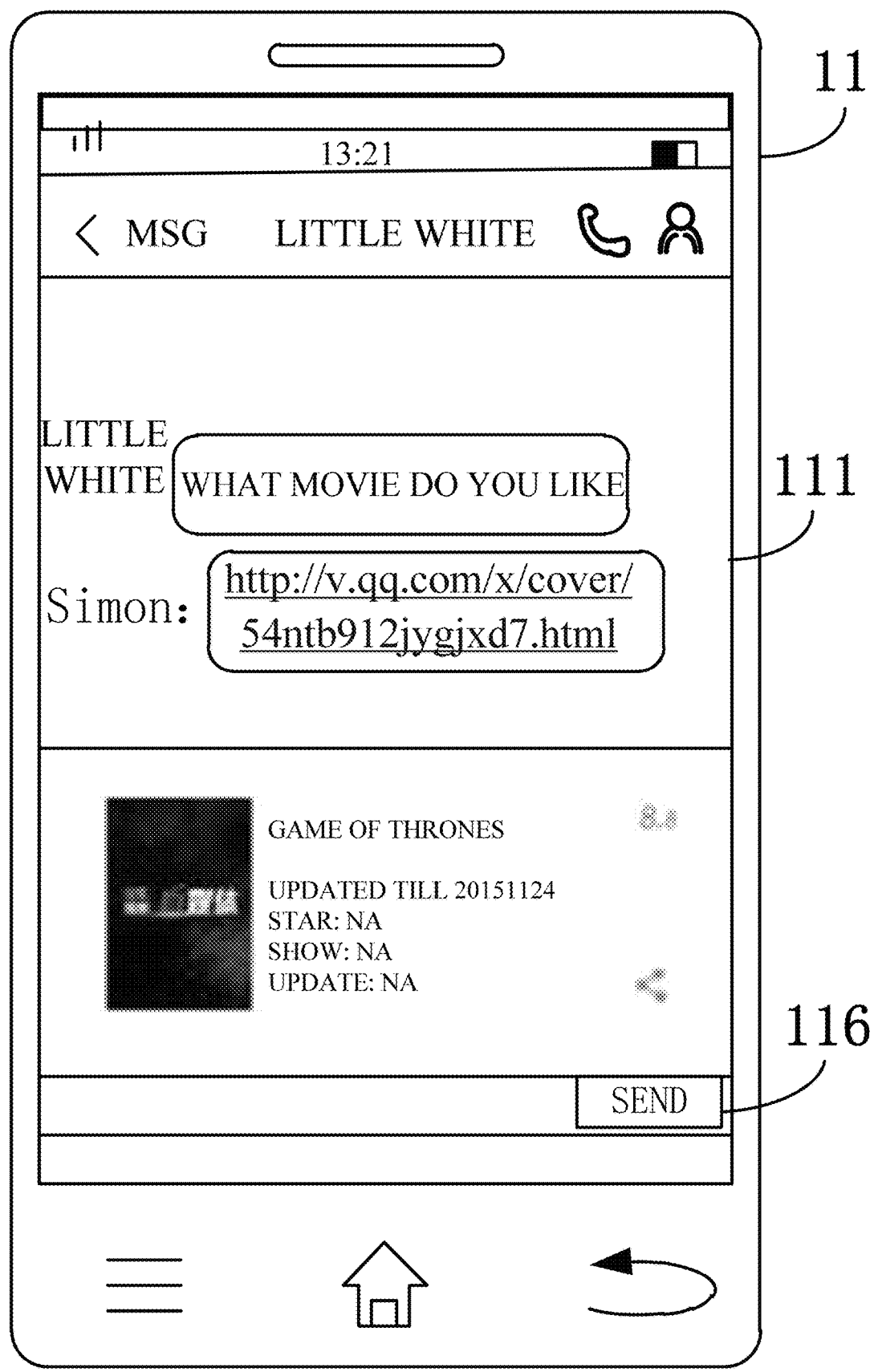
FIG. 2C is a diagram illustrating a scenario 2 for an information retrieval method according to the exemplary embodiment 1.

FIG. 2A is a schematic flowchart illustrating an information retrieval method according to an exemplary embodiment 1. FIG. 2B is a diagram illustrating a scenario 1 for an information retrieval method according to the exemplary embodiment 1. FIG. 2C is a diagram illustrating a scenario 2 for an information retrieval method according to the exemplary embodiment 1. In this embodiment which is based on the foregoing method provided by the embodiment of the present disclosure, illustrative description is made by taking an example, where a current interface is an inputting method interface and retrieved contents from a server are categorically displayed via an inputting method APP, and with reference to FIG. 1B. As shown in FIG. 2A, the following steps are included.

At step 201, it is detected whether textual contents in an inputting method interface have been entered in an input box of an instant messenger. When the textual contents have been entered into the input box of the instant messenger, step 202 will be performed. On the other hand, when the textual contents have not been entered into the input box of the instant messenger, the inputting method APP will stay in a monitoring state.

In an embodiment, it may be detected by an inputting method APP whether textual contents in an inputting method interface have been entered into an input box of an instant messenger. As shown in FIG. 1B, when detecting that an inputting key 115 is triggered, the inputting method APP determines that the current textual contents have been entered into an input box 114 of an instant messenger.

At step 202, when textual contents have been entered into the input box of the instant messenger, the textual contents are determined as chatting contents in the input box and it is detected that the chatting contents need to be sent to a communication counterpart.

At step 203, when it is detected that the chatting contents need to be sent to the communication counterpart, textual information in the chatting message is identified so as to acquire at least one keyword in the chatting contents, and the at least one keyword in the chatting contents is sent to a server.

At step 204, retrieved contents and at least one category, in which the retrieved contents are categorically stored in the server, are received from the server based on the at least one keyword.

Descriptions of step 203-step 204 can refer to the above descriptions of the embodiment illustrated by FIG. 1A, and are no longer detailed herein.

At step 205, the retrieved contents are categorically displayed in the inputting method interface, in accordance with the at least one category.

As shown in FIG. 2B, in an inputting method interface 112, retrieved contents which are associated with "game of thrones" and whose category is video are displayed. The retrieved contents include links, names corresponding to the links, and video-related information.

At step 206, it is detected whether a first preset trigger event occurs in the inputting method interface. When the first preset trigger event occurs in the inputting method interface, step 207 will be performed. On the other hand, when the first preset trigger event does not occur in the inputting method interface, the inputting method APP will continue staying in a detecting state.

At step 207, when the first preset trigger event occurs in the inputting method interface, a retrieved content corresponding to the first preset trigger event is determined.

At step 208, the retrieved content corresponding to the first preset trigger event is sent to the communication counterpart.

In an exemplary scenario, the first preset trigger event may be triggering a sending key or a sharing key in the inputting method interface 112. As shown in FIG. 2C, when the user Simon needs to send a link to Little White, he/she may trigger a sending key 116 in the inputting method interface 112. After detecting the trigger of the sending key 116, the inputting method APP directly sends the link corresponding to the sending key 116 to a communication counterpart (Little White). In an embodiment, the sending key 116 in the inputting method interface may interface with the sending key of the instant messenger, thereby enabling the user to directly send the retrieved content to be shared to the communication counterpart of the instant messenger, simply by using the inputting method APP.

In addition to the beneficial technical effects of the foregoing embodiment, this embodiment simplifies a user's operations for sharing information during his instant chatting and improves the efficiency for the user to share retrieved contents, by directly sending, in the inputting method interface, the retrieved contents to be shared to a communication counterpart.

Figure 3A:
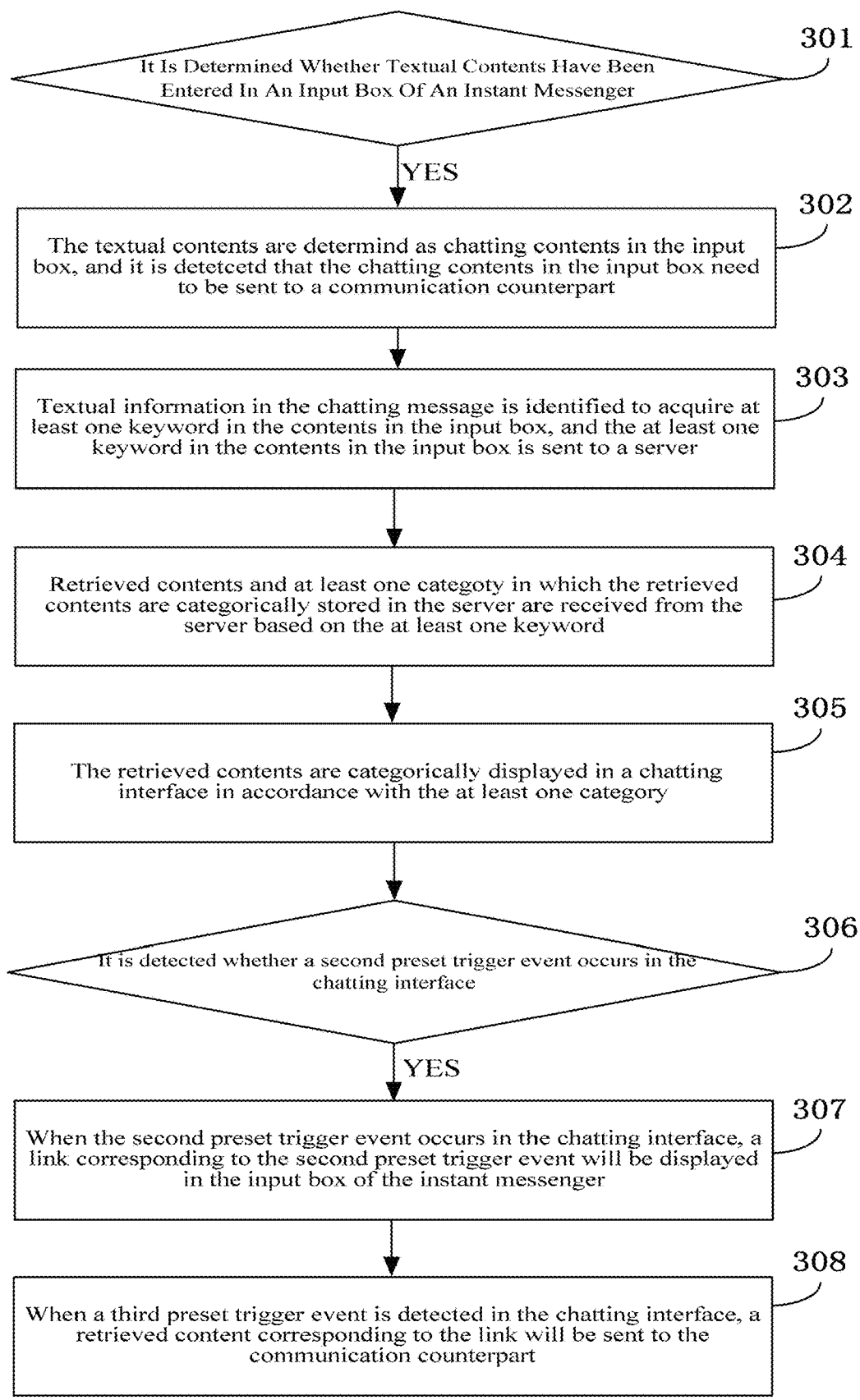
FIG. 3A is a schematic flowchart illustrating an information retrieval method according to an exemplary embodiment 2.
Figure 3B:
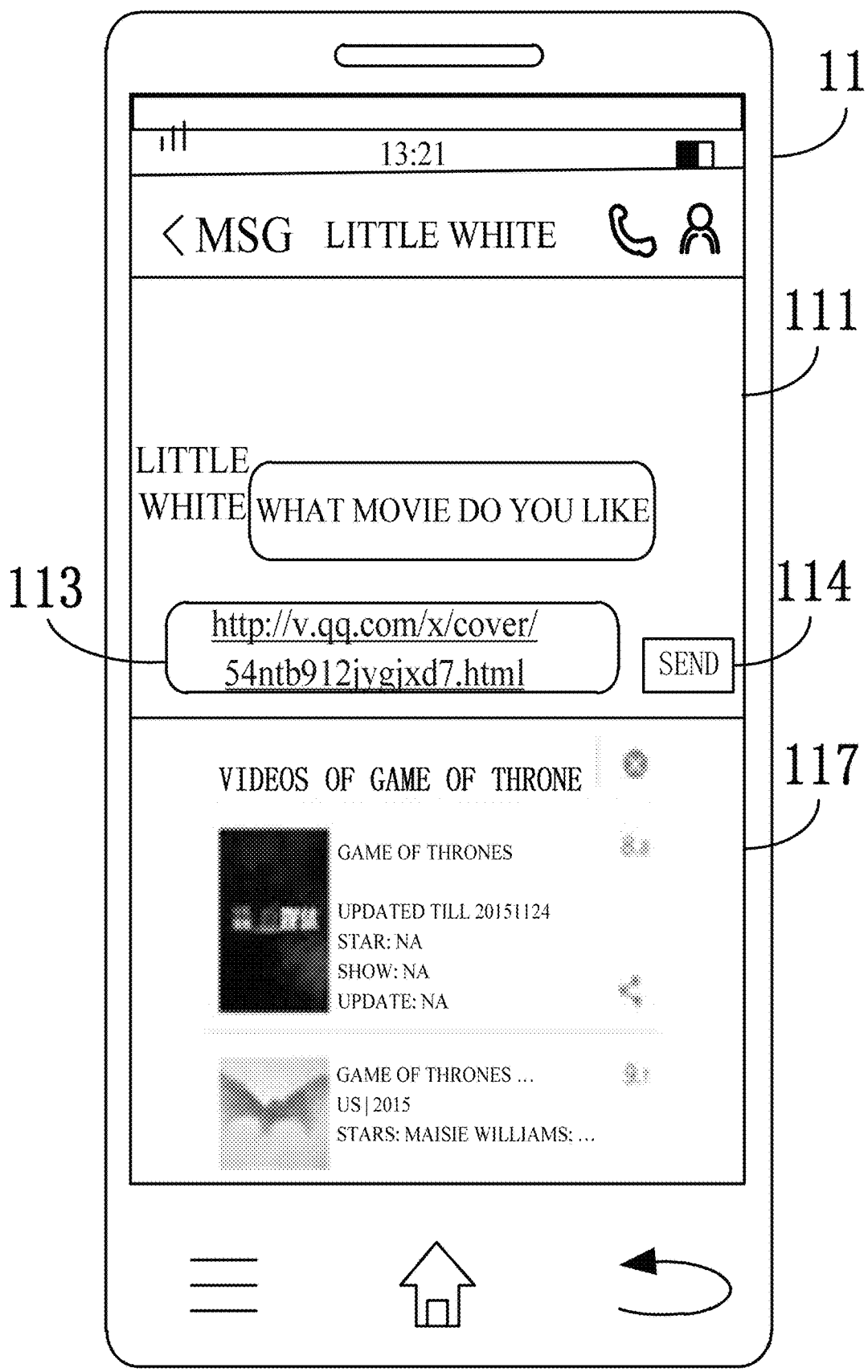
FIG. 3B is a diagram illustrating a scenario 1 for an information retrieval method according to the exemplary embodiment 2.
Figure 3C:
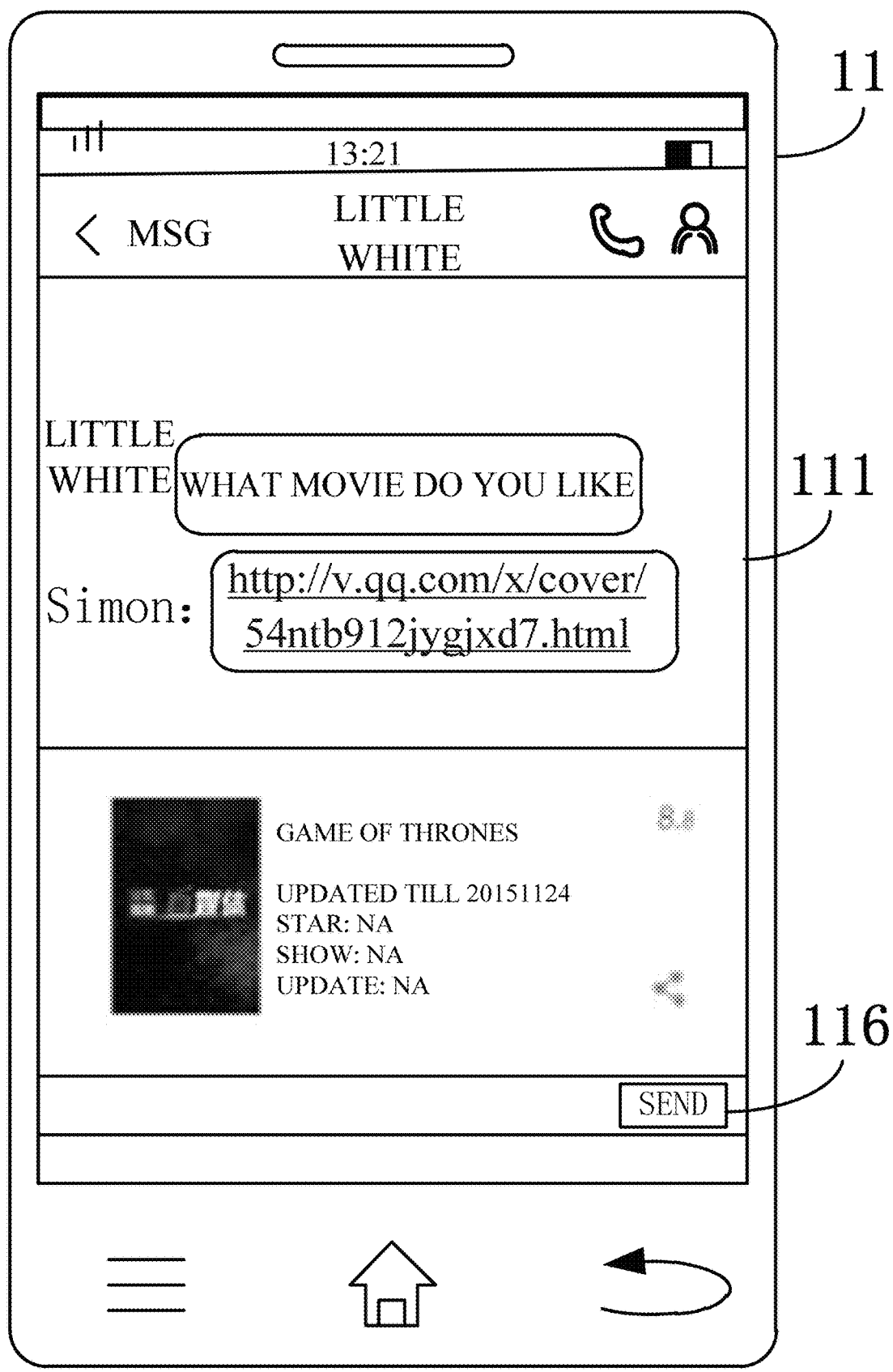
FIG. 3C is a diagram illustrating a scenario 2 for an information retrieval method according to the exemplary embodiment 2.

FIG. 3A is a schematic flowchart illustrating an information retrieval method according to an exemplary embodiment 2. FIG. 3B is a diagram illustrating a scenario 1 for an information retrieval method according to the exemplary embodiment 2. FIG. 3C is a diagram illustrating a scenario 2 for an information retrieval method according to the exemplary embodiment 2. In this embodiment which is based on the foregoing method provided by the embodiment of the present disclosure, illustrative description is made by taking an example, where a current interface is a chatting interface of an instant messenger and retrieved contents from a server are categorically displayed via the instant messenger, and with reference still to FIG. 1B. As shown in FIG. 3A, the following steps are included.

At step 301, it is determined whether textual contents have been entered in an input box of the instant messenger. When the textual contents have been entered into the input box, step 302 will be performed. On the other hand, when no textual content has been entered into the input box, the instant messenger will stay in a detecting state.

In an embodiment, textual contents in the input box may be detected by real-time interaction between the instant messenger and the inputting method APP. As shown in FIG. 1B, the instant messenger may interact with the inputting method APP in real time. When the inputting key 115 in the inputting method APP is triggered, the inputting method APP may inform the instant messenger that textual contents have been entered into the input box 114.

At step 302, when textual contents have been entered into the input box, the textual contents are determined as chatting contents in the input box, and it is detected that the chatting contents in the input box need to be sent to a communication counterpart.

At step 303, when it is detected that the contents in the input box need to be sent to the communication counterpart, textual information in the chatting message is identified so as to acquire at least one keyword in the contents in the input box, and the at least one keyword in the contents in the input box is sent to a server.

At step 304, retrieved contents and at least one category, in which the retrieved contents are categorically stored in the server, are received from the server based on the at least one keyword.

Descriptions of step 303-step 304 can refer to the above descriptions of the embodiment illustrated by FIG. 1A, and are no longer detailed herein.

At step 305, the retrieved contents are categorically displayed in the chatting interface, in accordance with the at least one category.

As shown in FIG. 3B, in a chatting interface 117 of the instant messenger, retrieved contents which are associated with "game of thrones" and whose category is video are displayed. The retrieved contents include links, names corresponding to the links, and video-related information.

At step 306, it is detected whether a second preset trigger event occurs in the chatting interface. When the second preset trigger event occurs in the chatting interface, step 307 will be performed.

At step 307, when the second preset trigger event occurs in the chatting interface, a link corresponding to the second preset trigger event will be displayed in the input box of the instant messenger.

At step 308, when a third preset trigger event is detected in the chatting interface, a retrieved content corresponding to the link will be sent to the communication counterpart.

In an exemplary scenario, the second preset trigger event may be triggering a sending key or a sharing key in the chatting interface 117. As shown in FIG. 3B, when the user Simon needs to send a link to Little White, he/she may select a retrieved content to be shared in the chatting interface 117. When the retrieved content is triggered, the link address of the retrieved content will be displayed in the input box 113 of the instant messenger. When the instant messenger detects that a sending key 114 is triggered, the link corresponding to the sending key 114 is directly sent to the communication counterpart (Little White). As shown in FIG. 3C, a link address is displayed in the chatting record. Here, an operating event of selecting a retrieved content to be shared from the retrieved contents can be taken as a second preset trigger event of the present disclosure, and an event triggered by the sending key 114 can be taken as a third preset trigger event of the present disclosure.

In addition to the beneficial technical effects of the foregoing embodiment, this embodiment ensures that a user can directly share information immediately via an instant messenger and improves the efficiency for the user to share retrieved contents, by directly sending, in the chatting interface, the retrieved contents to be shared to a communication counterpart.

Figure 4A:
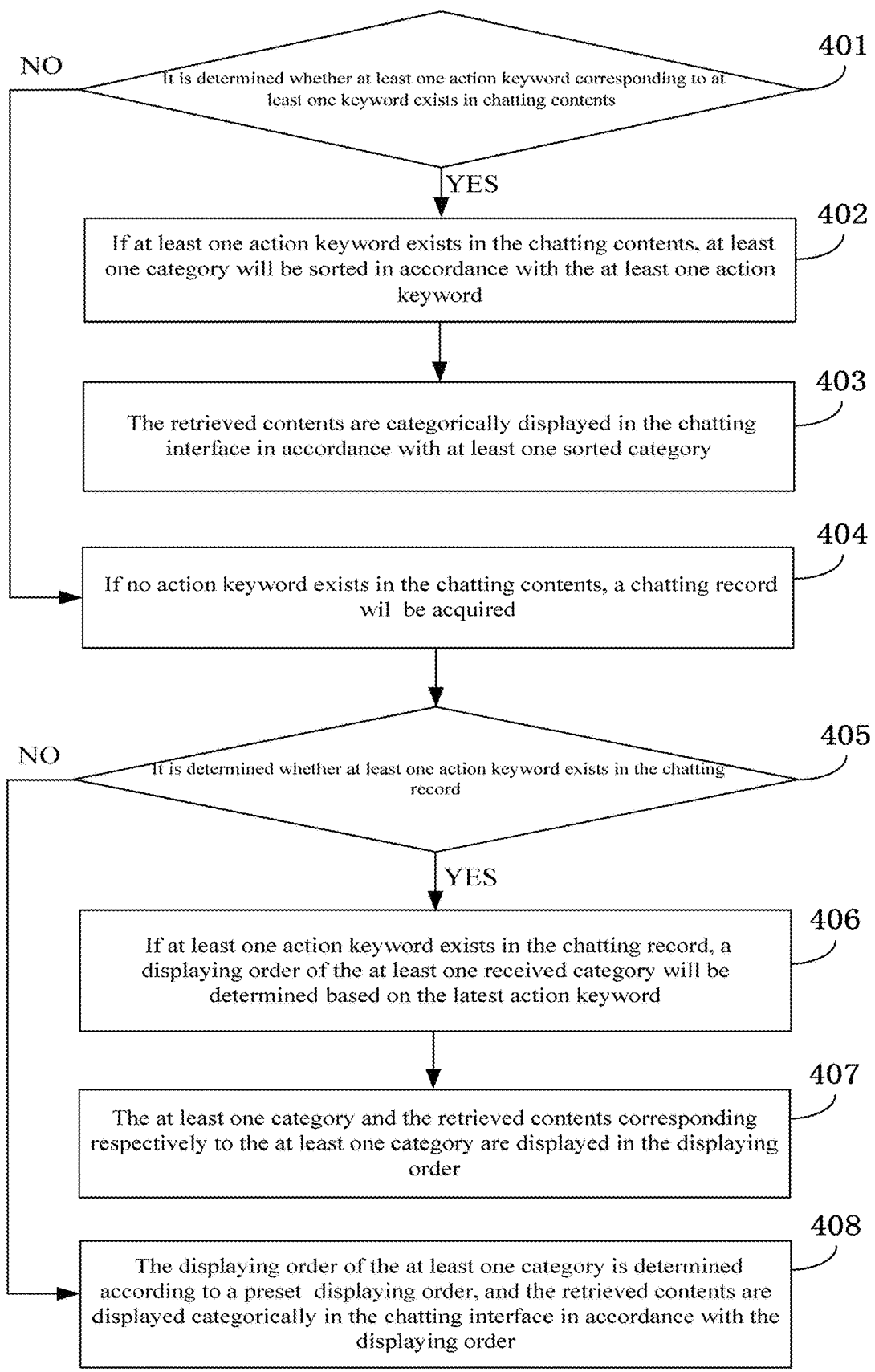
FIG. 4A is a schematic flowchart illustrating an information retrieval method according to an exemplary embodiment 3.
Figure 4B:
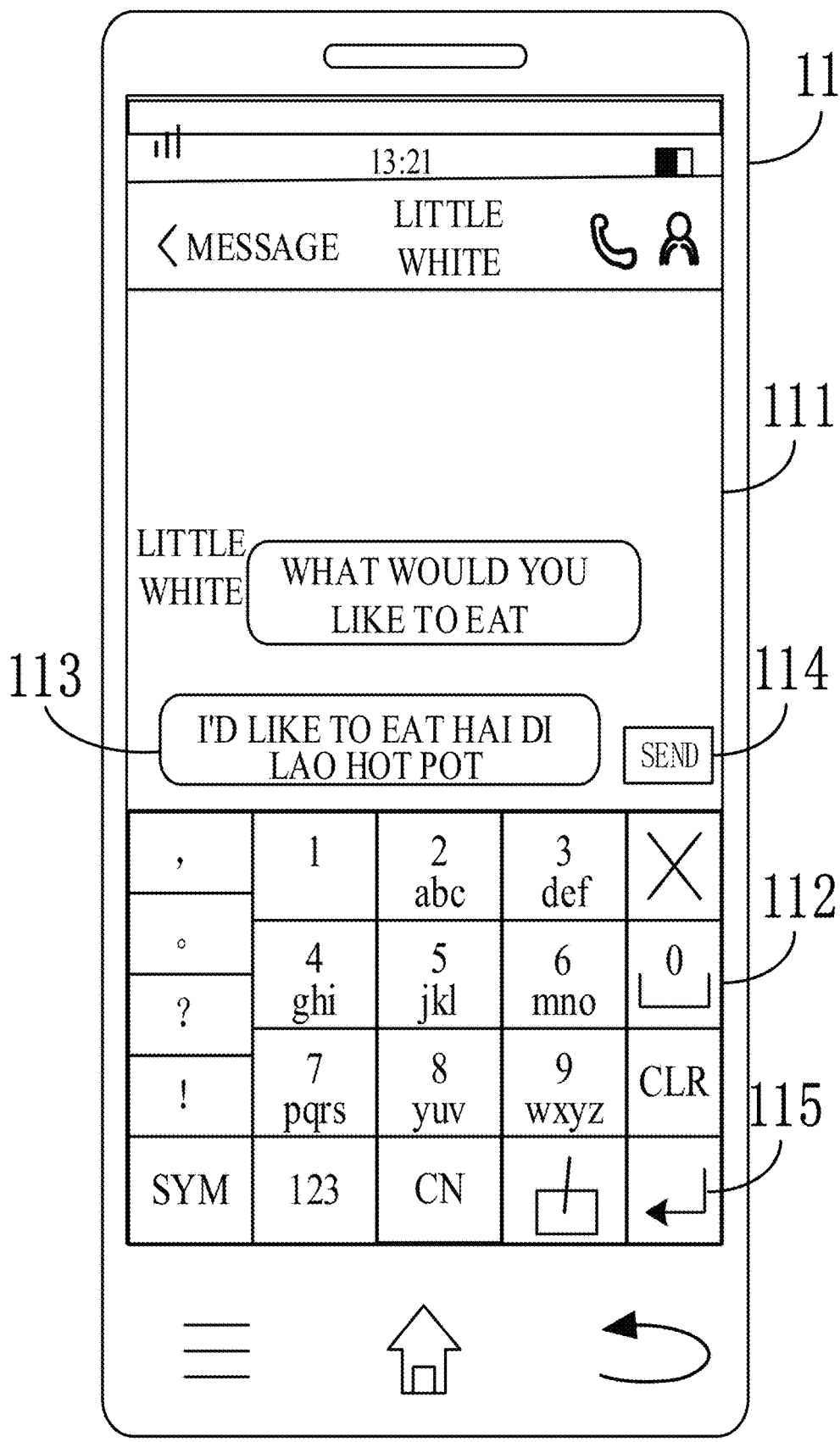
FIG. 4B is a diagram illustrating a scenario 1 for an information retrieval method according to the exemplary embodiment 3.
Figure 4C:
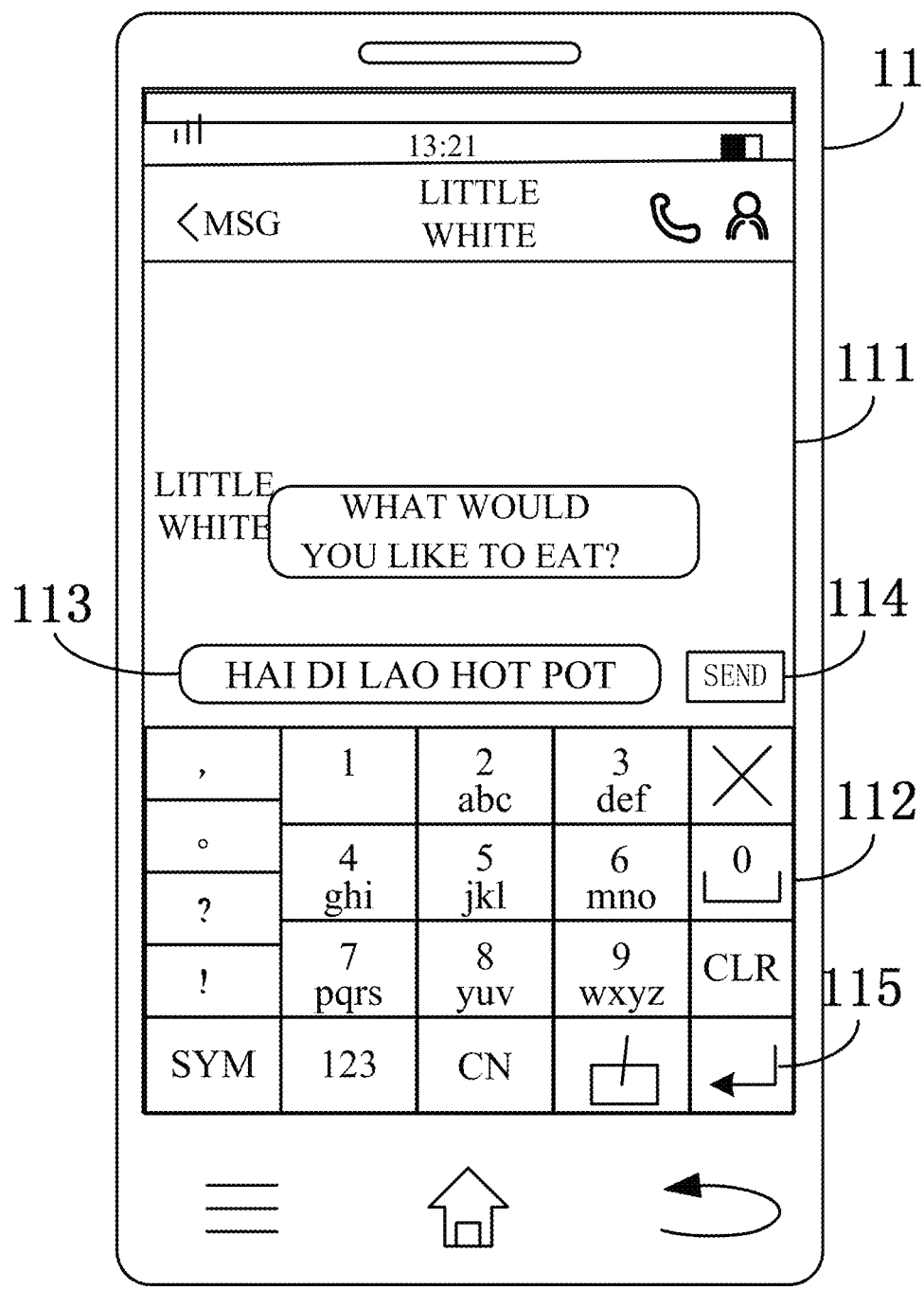
FIG. 4C is a diagram illustrating a scenario 2 for an information retrieval method according to the exemplary embodiment 3.

FIG. 4A is a schematic flowchart illustrating an information retrieval method according to an exemplary embodiment 3. FIG. 4B is a diagram illustrating a scenario 1 for an information retrieval method according to the exemplary embodiment 3. FIG. 4C is a diagram illustrating a scenario 2 for an information retrieval method according to the exemplary embodiment 3. In this embodiment which is based on the foregoing method provided by embodiment of the present disclosure, illustrative description is made of how to arrange retrieved contents in the current interface with reference to FIG. 1B. As shown in FIG. 4A, the following steps are included.

At step 401, it is determined whether at least one action keyword corresponding to at least one keyword exists in chatting contents in an input box. If at least one action keyword exists in the chatting contents, step 402 will be performed. On the other hand, if no action keyword exists in the input box, step 404 will be performed.

In an embodiment, the action keyword may be a preset verb. For example, it may be "look", "listen", "go", "check", or "eat". Accordingly, "look" may be corresponded to categories like video, book, news and etc. "Listen" is corresponded to a music category, "go" is corresponded to a map category, "check" is corresponded to an Encyclopedias category, and "eat" is corresponded to a catering category. Here, video, book, news, music, map, Encyclopedias and catering each corresponds respectively to a category. In an embodiment, an action keyword in chatting contents in the input box 113 may be identified by means of semantic identification. As shown in FIG. 4B, if Little White sends "What would you like to eat" to Simon and Simon enters "I'd like to eat Hai Di Lao Hot Pot" in the input box 113 of the instant messenger by using the inputting method APP, then the inputting method APP or the instant messenger can identify from the chatting contents, by means of semantic identification, that the action keyword is "eat" and the at least one keyword includes "Hai Di Lao Hot Pot".

At step 402, if at least one action keyword exists in the chatting contents, at least one category will be sorted in accordance with the at least one action keyword.

At step 403, the retrieved contents are categorically displayed in the chatting interface, in accordance with the at least one sorted category. Then, the process ends.

For example, after retrieved contents are acquired according to any of the above embodiments illustrated in FIG. 1A, FIG. 2A and FIG. 3A, if "eat" is identified from chatting contents in the input box 113 of FIG. 4B, it is possible to arrange, among all retrieved contents returned by the server 12, retrieved contents of the "catering" category at the beginning position or in the beginning page, followed by retrieved contents of other categories (such as retrieved contents corresponding to the "news" category and the "book" category).

At step 404, if no action keyword exists in the chatting contents, a chatting record will be acquired.

As shown in FIG. 4C, Little White sends "What would you like to eat" to Simon, and chatting contents entered by Simon in the input box 113 via the inputting method APP are "Hai Di Lao Hot Pot". As the action keyword "eat" does not exist in the "Hai Di Lao Hot Pot", the inputting method APP or the instant messenger can acquire a chatting record in the instant messenger so as to ensure that the retrieved contents are closely related to the chatting topic. For example, the latest chatting record is "What would you like to eat" sent by Little White.

At step 405, it is determined whether at least one action keyword exists in the chatting record. If at least one action keyword exists in the chatting record, step 406 will be performed. On the other hand, if no action keyword exists in the chatting record, step 408 will be performed.

At step 406, if at least one action keyword exists in the chatting record, a displaying order of the at least one received category will be determined based on the latest action keyword.

In an embodiment, a matching degree between the latest action keyword and each of the at least one category may be determined so as to acquire at least one matching result; and the displaying order of the at least one category is determined in accordance with a descending order of the at least one matching result. For example, if the latest action keyword is "eat" and the at least one category are catering, news and book, then the matching degree between "eat" and "catering" may be determined as 100%, the matching degree between "eat" and "news" may be determined as 50% and the matching degree between "eat" and "book" may be determined as 30%. Accordingly, the displaying order is: catering>news>book. In an embodiment, a matching degree between an action keyword and a category may be set in advance in accordance with a correlation degree between the action keyword and retrieved contents corresponding to the category. For example, the matching degree between "eat" and "catering" is 100%, and the matching degree between "eat" and "news" is 30%.

In another embodiment, if the at least one matching result indicates that multiple categories have the same matching degree, a displaying order of the multiple categories with the same matching degree in the current interface will be determined according to a preset order. For example, if both the matching degree between "eat" and "news" and the matching degree between "eat" and "book" are 40% and if the preset order is "news">"book", then it is possible to arrange retrieved contents of the "news" category before retrieved contents of the "book" category for displaying.

In an embodiment, if "eat" is identified from the latest chatting content in the input box by means of semantic identification, it is still possible to sort the at least one category in accordance with the action keyword. Relevant descriptions can refer to that of step 404 and are no longer detailed herein.

At step 407, the at least one category and the retrieved contents corresponding respectively to the at least one category are displayed in the displaying order. Then, the process ends.

At step 408, if no action keyword exists in the chatting record which means it fails to acquire the latest action keyword in the chatting record, the displaying order of the at least one category is determined according to a preset displaying order, and the retrieved contents are displayed categorically in the chatting interface in accordance with the displaying order. The process ends.

In an embodiment, the preset displaying order may be set by an instant messenger or inputting method APP in advance or by a user according to his/her requirements for information retrieval. For example, the preset displaying order is such that: retrieved contents of the video category is arranged at the beginning, followed by retrieved contents of the music category and followed by retrieved contents of the book category. That is, video>music>book. If the setting is based on the user's information retrieval requirements, corresponding options may be provided by the instant messenger or inputting method APP for customization by the user.

In this embodiment, by sorting at least one category and categorically displaying retrieved contents in a chatting interface in accordance with the sorted at least one category, retrieved contents associated with the current chatting topic can be arranged at appropriate positions, thereby eliminating the need for a user to find a retrieved content to be shared from all retrieved contents and improving the efficiency for the user to share the retrieved content.

Figure 5:
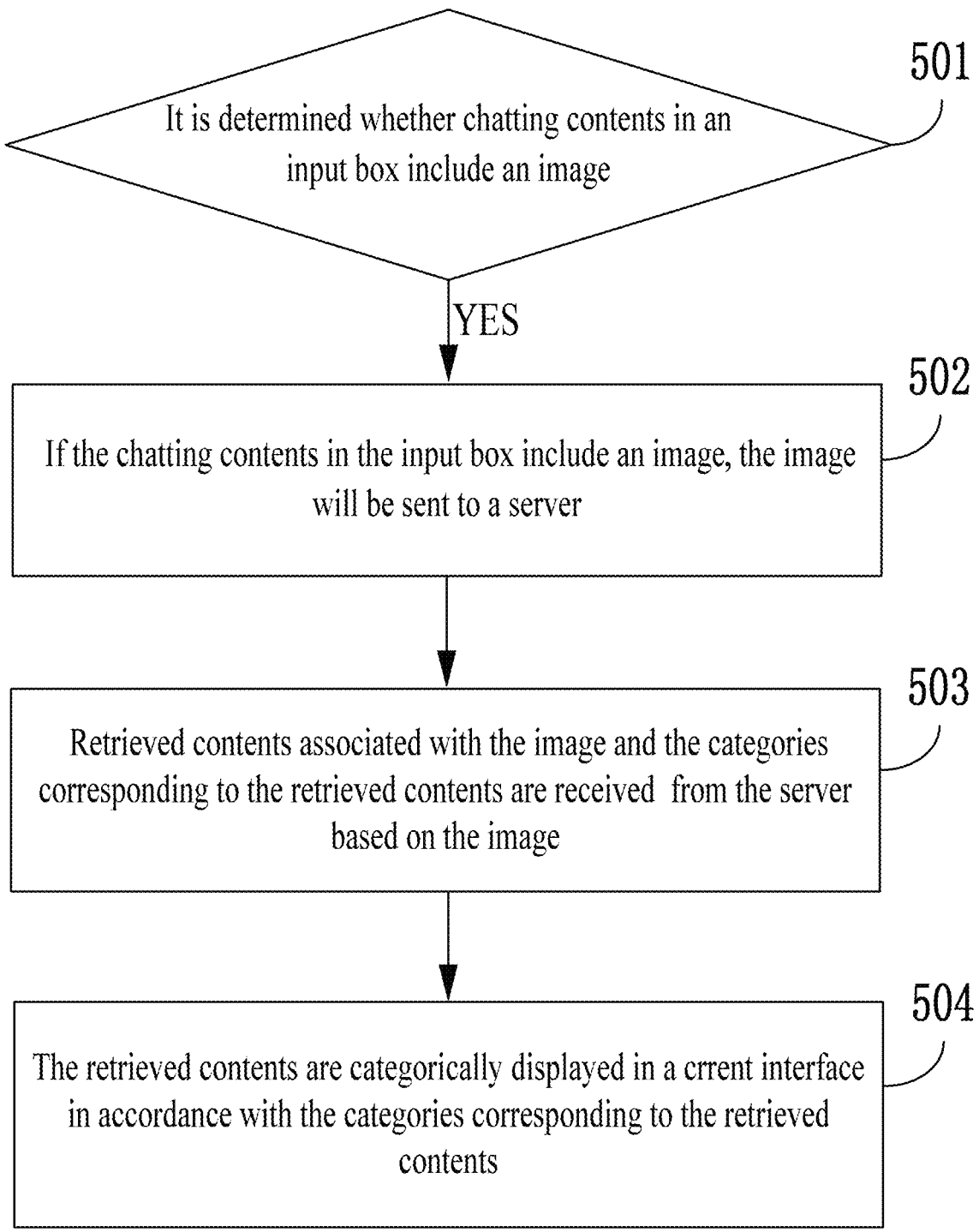
FIG. 5 is a schematic flowchart illustrating an information retrieval method according to an exemplary embodiment 4.

FIG. 5 is a schematic flowchart illustrating an information retrieval method according to an exemplary embodiment 4. In this embodiment which is based on the foregoing method provided by the embodiment of the present disclosure, illustrative description is made, with reference to FIG. 1B, of how to retrieve contents based on an image and share the retrieved contents with a communication counterpart when chatting contents in an input box include the image. As shown in FIG. 5, the following steps are included.

At step 501, it is determined whether chatting contents in the input box include an image. If chatting contents in the input box include an image, step 502 will be performed. On the other hand, if chatting contents in the input box do not include an image, retrieved contents may be determined and categorically displayed according to any of the above embodiments illustrated in FIG. 1A, FIG. 2A and FIG. 3A.

At step 502, if the chatting contents in the input box include an image, the image will be sent to a server.

At step 503, retrieved contents associated with the image and categories corresponding to the retrieved contents are received from the server based on the image.

At step 504, the retrieved contents are categorically displayed in a current interface in accordance with the categories corresponding to the retrieved contents.

In an exemplary scenario, illustrative description is made by taking an example where an inputting method APP performs the above step 501-step 504. When a user needs to send an image to a communication counterpart, an instant messenger may inform the inputting method APP of the image. The inputting method APP sends the image to a server 12 through a corresponding interface. After the server 12 performs image recognition on the image to identify for example facial features of a celebrity on the image, the server 12 may retrieve contents of the celebrity in databases corresponding to categories such as video, audio, news, image, etc., and determine categories corresponding to the retrieved contents. After receiving the retrieved contents and the categories corresponding to the retrieved contents, the inputting method APP categorically displays the retrieved contents in an inputting method interface, in accordance with the categories corresponding to the retrieved contents. For example, video, audio, news, image and other categories are respectively displayed in the inputting method interface in a paging display mode or in a scrollable mode (for example, via a scroll bar).

In another exemplary scenario, illustrative description is made by taking an example where an instant messenger performs the foregoing step 501-step 504. When a user needs to send an image to a communication counterpart, the instant messenger sends the image to the server 12 through a corresponding interface. After the server 12 performs image recognition on the image to identify for example facial features of a celebrity on the image, the server 12 may retrieve contents of the celebrity in databases corresponding to categories such as video, audio, news, image, etc., and determine categories corresponding to the retrieved contents. After receiving the retrieved contents and the categories corresponding to the retrieved contents, the instant messenger categorically displays the retrieved contents in a chatting interface, in accordance with the categories corresponding to the retrieved contents. For example, video, audio, news, image and other categories are respectively displayed in the chatting interface in a paging display mode or in a scrollable mode.

Alternatively, the inputting method APP or instant messenger installed in the electronic device 11 may identify key information of the image (for example, facial features in the image or text in the image, etc.) by performing image recognition. Alternatively, when the instant messenger needs to send an image, an image recognition APP installed in the electronic device 11 may identify key information of the image (for example, facial features in the image or text in the image, etc.) by performing image recognition, and send the key information of the image to the server 12. The server 12 retrieves, from multiple databases, retrieved contents corresponding to the key information of the image, and sends the retrieved contents to the electronic device 11.

In this embodiment, when chatting contents between a user and a communication counterpart include an image, retrieved contents needed by the user will be displayed based on characteristics in the image, making the user's chatting more intuitive and straightforward.

Figure 6A:
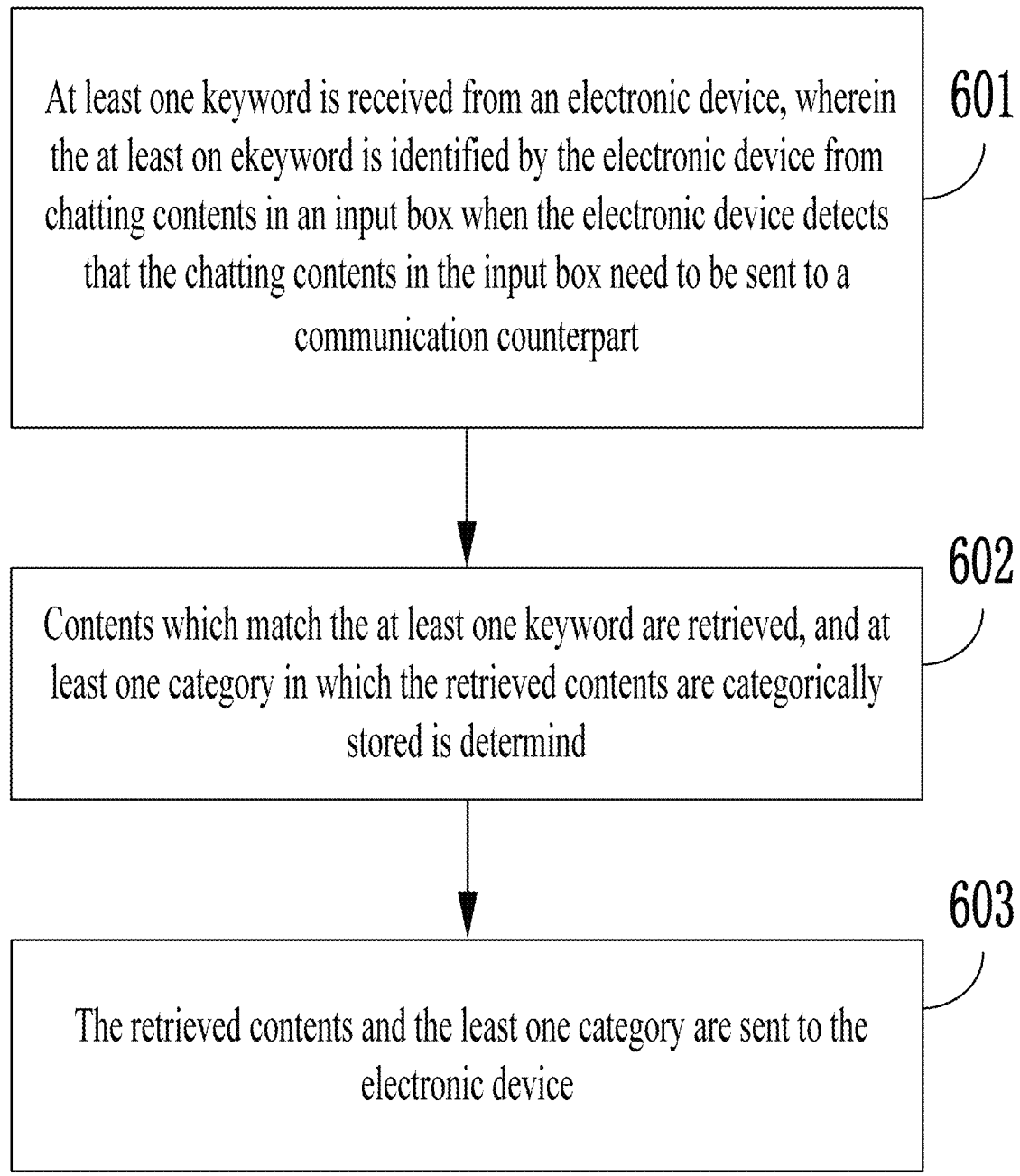
FIG. 6A is a schematic flowchart illustrating an information retrieval method according to an exemplary embodiment 5.
Figure 6B:
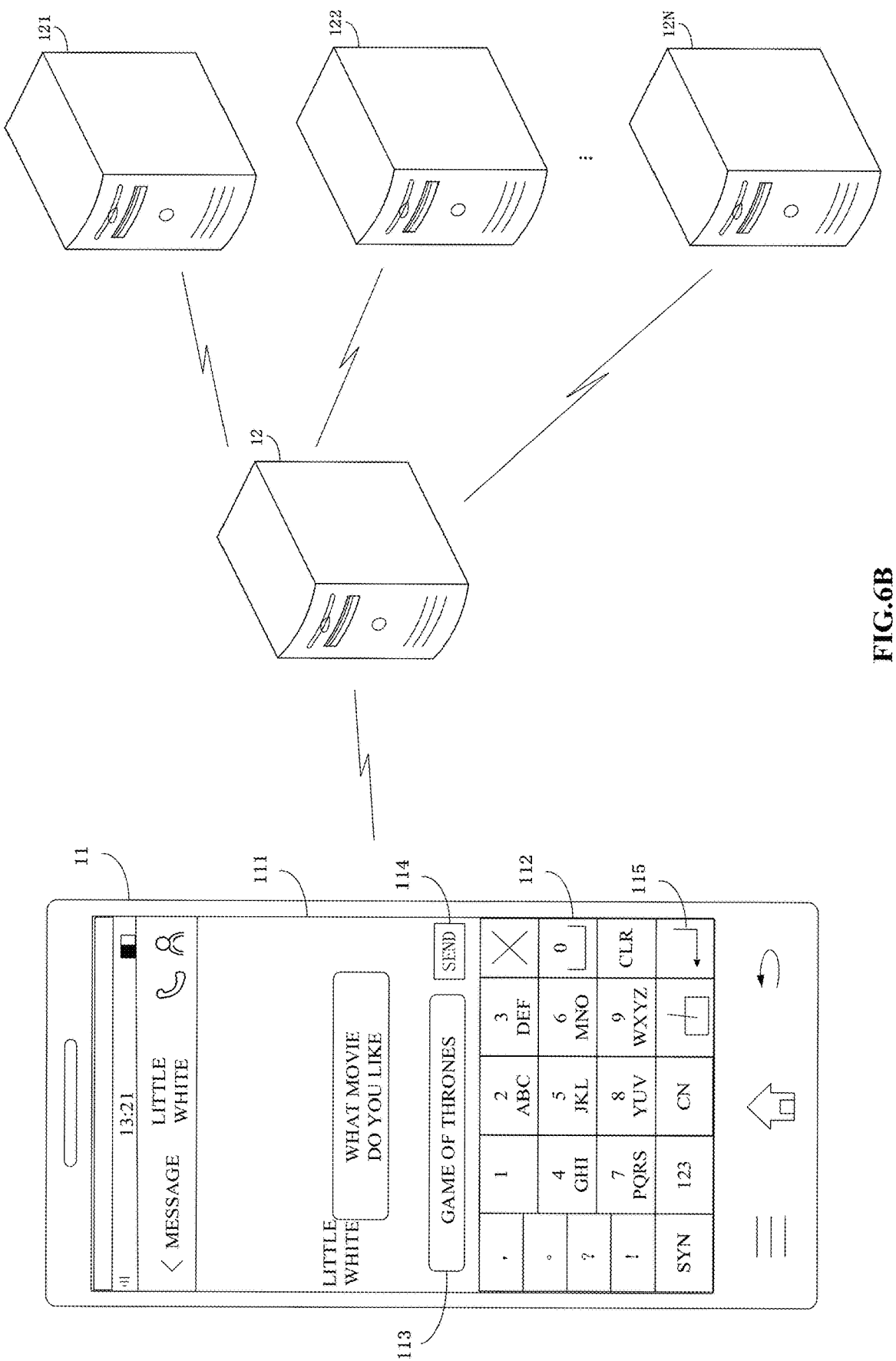
FIG. 6B is a diagram illustrating a scenario for an information retrieval method according to the exemplary embodiment 5.

FIG. 6A is a schematic flowchart illustrating an information retrieval method according to an exemplary embodiment 5. FIG. 6B is diagram illustrating a scenario for an information retrieval method according to the exemplary embodiment 5. The information retrieval method may be used in a server. In this embodiment, illustrative description is made with reference to FIG. 1B. As shown in FIG. 6A, the information retrieval method comprises the following steps 601-603.

At step 601, at least one keyword is received from an electronic device, wherein the at least one keyword is identified by the electronic device from chatting contents in an input box when the electronic device detects that the chatting contents in the input box need to be sent to a communication counterpart.

At step 602, contents which match the at least one keyword are retrieved, and at least one category in which the retrieved contents are categorically stored is determined.

At step 603, the retrieved contents and the at least one category are sent to the electronic device.

As shown in FIG. 6B, in an exemplary scenario, a server 12 may correspond to multiple database servers. For example, the server 12 retrieves contents in a database server 121, a database server 122, . . . a database server 12N, wherein N represents the number of the database servers and is a positive integer. Each database server may store retrieved contents of one category, or may retrieve contents whose category is consistent with that of the database server from the Internet in accordance with an instruction from the server 12. For example, if the category of the database server 121 is news, the database server 121 may acquire and store information of the news category from the Internet in real time or periodically. By implementing the database as multiple database servers, the server side can be implemented in a distributed manner, thereby reducing the burden of storing retrieved contents on the server.

In an embodiment, when receiving at least one keyword from an electronic device 11, the server 12 may retrieve contents which match the at least one keyword from the database server 121, database server 122, . . . , database server 12N in turn. For example, the at least one keyword includes "game of thrones". The server 12 needs to retrieve contents which match "game of thrones" in the database server 121, database server 122, . . . , database server 12N. For example, ten videos associated with "game of thrones" are retrieved in the database server 121, five pieces of news associated with "game of thrones" are retrieved in the database server 122, and no content associated with the "game of thrones" is retrieved in other database servers. Then, the server 12 may send the ten videos associated with "game of thrones" and the five pieces of news associated with "game of thrones" as the retrieved contents to the electronic device 11. In addition, as the retrieved contents relate to the video category and the news category, "video" and "news" may be sent as two categories to the electronic device 11.

Furthermore, when an image from the electronic device 11 is received by the server 12, image recognition will be performed on the image to extract key information of the image, and contents which match the key information of the image will be retrieved in the database server 121, database server 122, . . . , database server 12N. The retrieved contents which match the key information of the image and at least one category corresponding to at least one database where the retrieved contents are located are sent to the electronic device 11. By retrieving contents needed by the user based on characteristics of the image, the user's chatting is made more intuitive and straightforward.

In this embodiment, retrieved contents which are retrieved by the server based on at least one keyword and at least one category corresponding to the retrieved contents are displayed in the current interface. As the at least one keyword is acquired based on contents in an input box at the user end, the retrieved contents are related closely to a topic of the chatting. The retrieved contents enable the user to make direct access to the information he/she needs.

Figure 7:
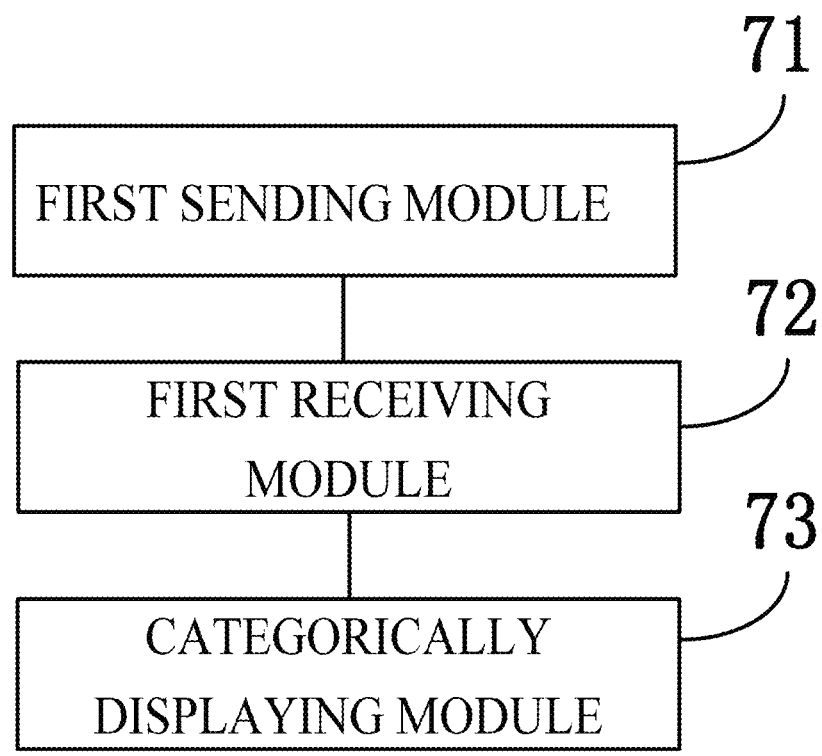
FIG. 7 is a schematic diagram illustrating a structure of an information retrieval apparatus according to an exemplary embodiment.

FIG. 7 is a schematic diagram illustrating a structure of an information retrieval apparatus according to an exemplary embodiment. As shown in FIG. 7, the information retrieval apparatus comprises a first sending module 71, a first receiving module 72 and a categorically displaying module 73.

The first sending module 71 is configured to send at least one keyword in chatting contents in an input box to a server, when it is detected that the chatting contents need to be sent to a communication counterpart.

The first receiving module 72 is configured to receive, from the server based on the at least one keyword sent by the first sending module 71, retrieved contents and at least one category in which the retrieved contents are categorically stored in the server.

The categorically displaying module 73 is configured to categorically display, in a current interface, the retrieved contents received by the first receiving module 72, in accordance with the at least one category received by the first receiving module 72.

Figure 8:
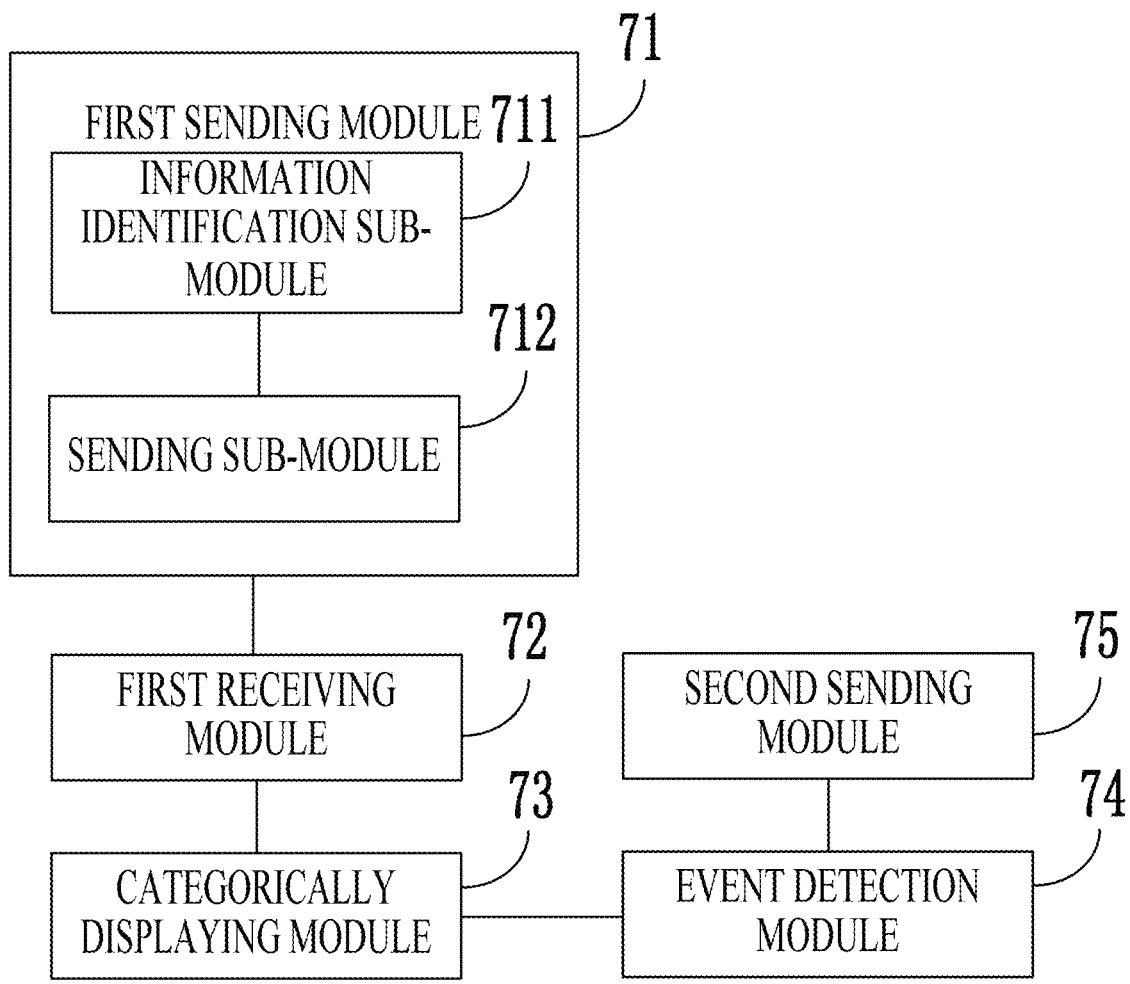
FIG. 8 is a schematic diagram illustrating a structure of another information retrieval apparatus according to an exemplary embodiment.

FIG. 8 is a schematic diagram illustrating a structure of another information retrieval apparatus according to an exemplary embodiment. As shown in FIG. 8, on the basis of the above embodiment illustrated in FIG. 7, the first sending module 71 in the present embodiment comprises an information identification sub-module 711 and a sending sub-module 712.

The information identification sub-module 711 is configured to, when it is detected that there are textual contents entered in an input box of an instant messenger, identify textual information in the chatting contents so as to acquire at least one keyword in chatting contents.

The sending sub-module 712 is configured to send the at least one keyword in the chatting contents identified by the information identification sub-module 711 to the server.

In an embodiment, the apparatus may further comprise: an event detection module 74 configured to detect whether a trigger event for sharing of a retrieved content occurs in the current interface in which the retrieved contents are displayed categorically; and a second sending module 75 configured to, when the event detection module 74 detects that the trigger event for sharing of the retrieved content occurs, send the retrieved content to be shared to the communication counterpart.

Figure 9:
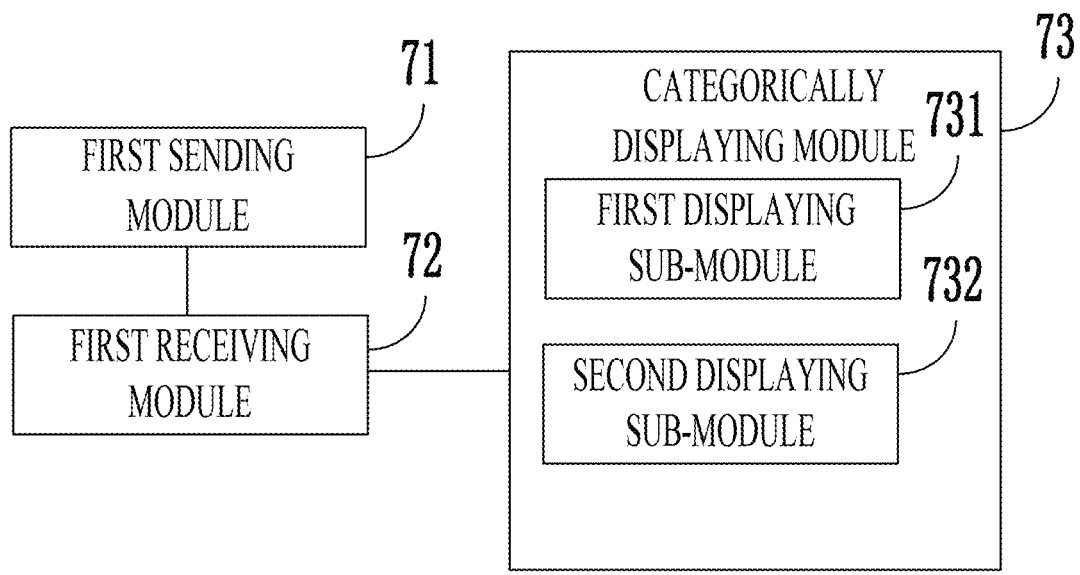
FIG. 9 is a schematic diagram illustrating a structure of yet another information retrieval apparatus according to an exemplary embodiment.

FIG. 9 is a schematic diagram illustrating a structure of yet another information retrieval apparatus according to an exemplary embodiment. As shown in FIG. 9, on the basis of any of the above embodiments illustrated in FIG. 7-FIG. 8, the categorically displaying module 73 in this embodiment may comprise a first displaying sub-module 731 or a second displaying sub-module 732.

The first displaying sub-module 731 is configured to categorically display the retrieved contents in an inputting method interface in accordance with the at least one category.

The second displaying sub-module 732 is configured to categorically display the retrieved contents in a chatting interface in accordance with the at least one category.

Figure 10:
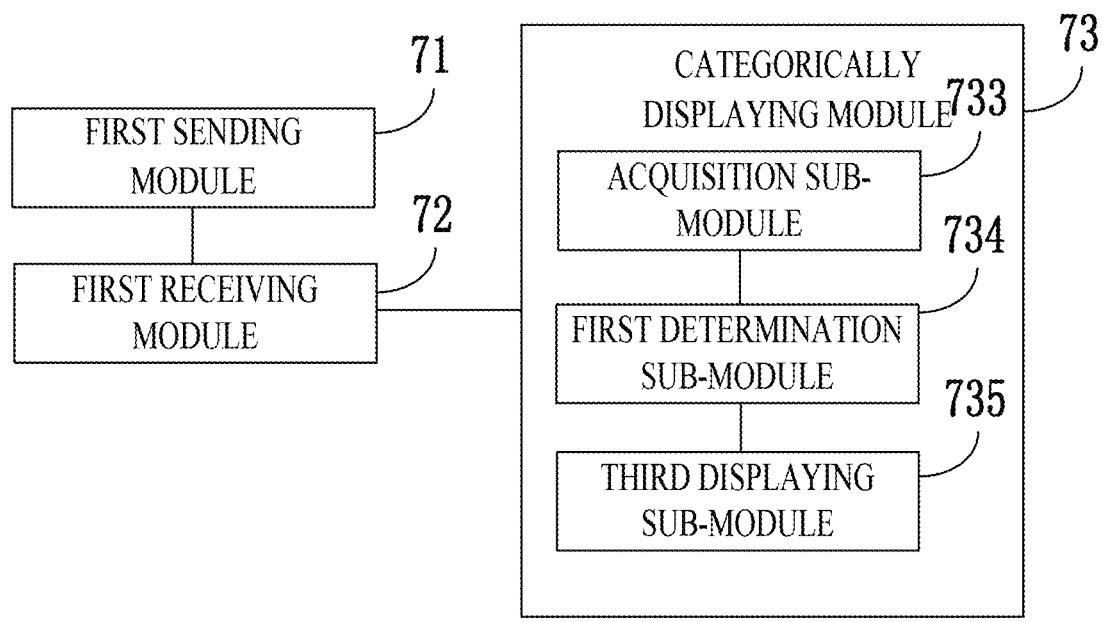
FIG. 10 is a schematic diagram illustrating a structure of still another information retrieval apparatus according to an exemplary embodiment.

FIG. 10 is a schematic diagram illustrating a structure of still another information retrieval apparatus according to an exemplary embodiment. As shown in FIG. 10, on the basis of any of the above embodiments illustrated in FIG. 7-FIG. 9, the categorically displaying module 73 in this embodiment may comprise an acquisition sub-module 733, a first determination sub-module 734, and a third displaying sub-module 735.

The acquisition sub-module 733 is configured to acquire a latest action keyword in a chatting record, when the at least one category is received from the server.

The first determination sub-module 734 is configured to determine a displaying order of the at least one received category based on the latest action keyword acquired by the acquisition sub-module 733.

The third displaying sub-module 735 is configured to display, in the displaying order determined by the first determination sub-module 734, the at least one category and the retrieved contents corresponding respectively to the at least one category.

In an embodiment, the first determination sub-module 734 may be further configured to determine the displaying order of the at least one category according to a preset displaying order, if the acquisition sub-module 733 fails to acquire the latest action keyword in the chatting record or in the chatting contents.

In an embodiment, the first determination sub-module 734 may be configured to: determine a matching degree between the latest action keyword and each of the at least one category so as to acquire at least one matching result; determine the displaying order of the at least one category, in accordance with a descending order of the at least one matching result; and if the at least one matching result indicates that multiple categories have the same matching degree, determine a displaying order of the multiple categories with the same matching degree in the current interface according to a preset order.

Figure 11:
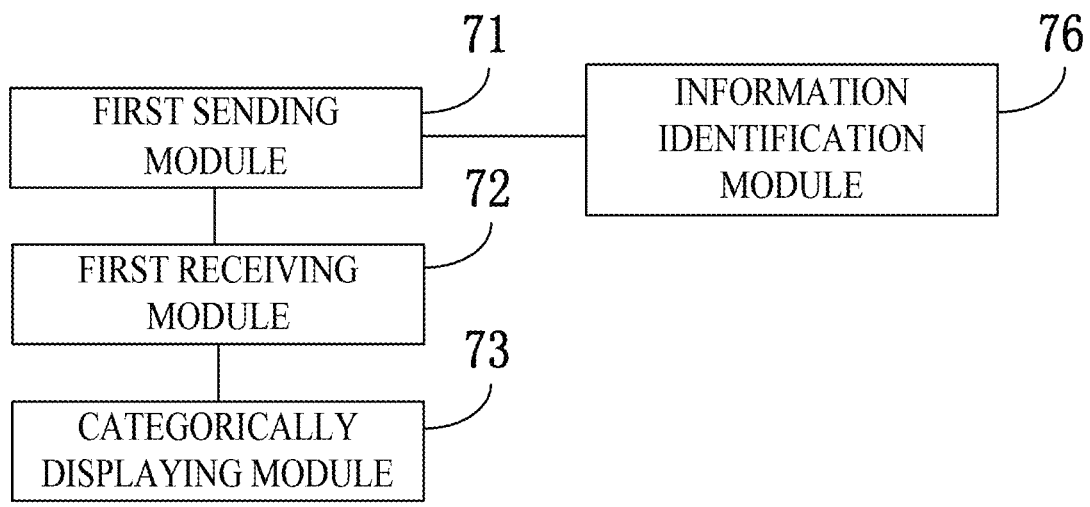
FIG. 11 is a schematic diagram illustrating a structure of a further information retrieval apparatus according to an exemplary embodiment.

FIG. 11 is a schematic diagram illustrating a structure of a further information retrieval apparatus according to an exemplary embodiment. As shown in FIG. 11, on the basis of any of the above embodiments illustrated in FIG. 7-FIG. 10, when it is detected that the chatting contents in the input box to be sent from the first sending module to the communication counterpart include an image, the first sending module 71 in this embodiment is further configured to send the image as the at least one keyword to the server. Alternatively, the apparatus may further comprise an information identification module 76 configured to identify key information of the image to be sent from the first sending module 71 to the communication counterpart, and the first sending module 71 sends the key information of the image identified by the information identification module 76 as the at least one keyword to the server.

Figure 12:
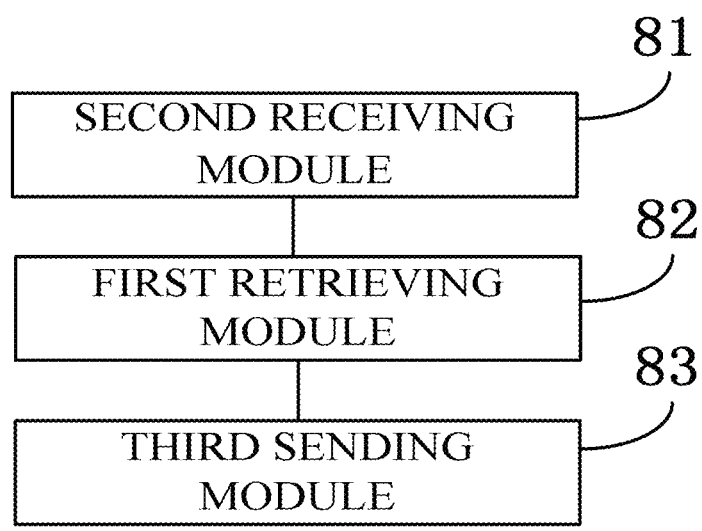
FIG. 12 is a schematic diagram illustrating a structure of yet a further an information retrieval apparatus according to an exemplary embodiment.

FIG. 12 is a schematic diagram illustrating a structure of yet a further information retrieval apparatus according to an exemplary embodiment. As shown in FIG. 12, the information retrieval apparatus may comprise a second receiving module 81, a first retrieving module 82 and a third sending module 83.

The second receiving module 81 is configured to receive at least one keyword from an electronic device, wherein the at least one keyword is identified from chatting contents in an input box by the electronic device when the electronic device detects that the chatting contents need to be sent to a communication counterpart.

The first retrieving module 82 is configured to retrieve contents which match the at least one keyword received by the second receiving module 81, and to determine at least one category in which the retrieved contents are categorically stored.

The third sending module 83 is configured to send the retrieved contents retrieved by the first retrieving module 82 and the at least one category to the electronic device.

Figure 13:
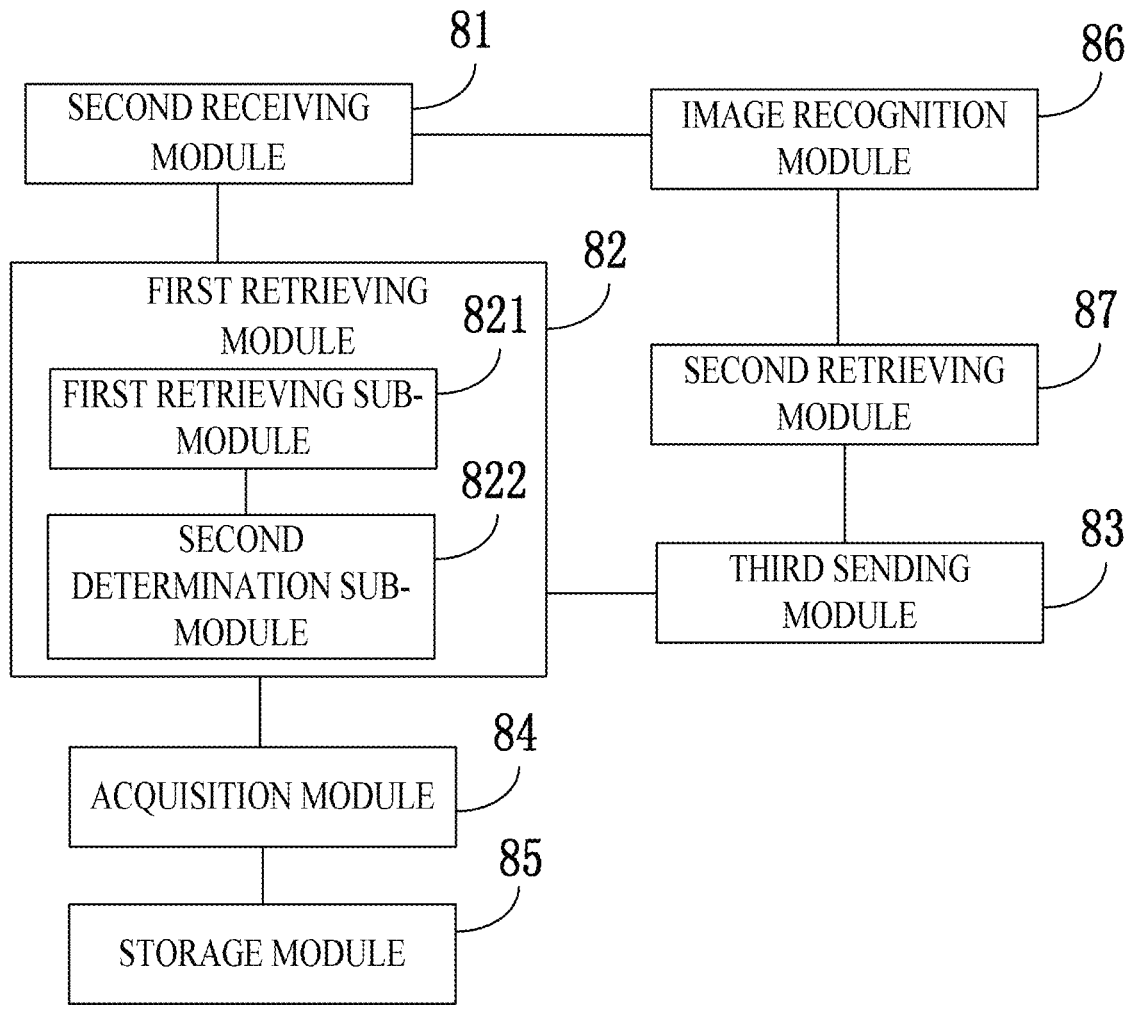
FIG. 13 is a schematic diagram illustrating a structure of still a further information retrieval apparatus according to an exemplary embodiment.

FIG. 13 is a schematic diagram illustrating a structure of still a further information retrieval apparatus according to an exemplary embodiment. As shown in FIG. 13, on the basis of the above embodiment illustrated in FIG. 12, the first retrieving module 82 in this embodiment may comprise a first retrieving sub-module 821 and a second determination sub-module 822.

The first retrieving sub-module 821 is configured to retrieve, in multiple databases in turn, contents which match the at least one keyword, each of the multiple databases corresponding to a category respectively.

The second determination sub-module 822 is configured to determine at least one category corresponding to at least one database where the retrieved contents retrieved by the first retrieving sub-module 821 are located, as the at least one category in which the retrieved contents are categorically stored.

In an embodiment, the information retrieval apparatus further comprises: an acquisition module 84 configured to control the multiple databases to acquire Internet contents of categories corresponding respectively to the databases from the Internet in real time or periodically; and a storage module 85 configured to store the Internet contents acquired by the acquisition module 84 into the databases, in accordance with their respective categories. As such, the first retrieving module 82 can retrieve, from the databases, contents which match the at least one keyword, and can determine at least one category in which the retrieved contents are categorically stored.

In an embodiment, the information retrieval apparatus further comprises: an image recognition module 86 configured to perform image recognition on an image to extract key information from the image, when the image is received from the electronic device by the second receiving module 81; and a second retrieving module 87 configured to retrieve, from the multiple databases, contents matching the key information of the image identified by the image recognition module 86. The third sending module 83 is further configured to send, to the electronic device, the retrieved contents matching the key information of the image retrieved by the second retrieving module 87 and categories corresponding to the databases where the retrieved contents are located.

Regarding the apparatus in the above embodiments, the specific manners for the individual modules to perform operations have been described in detail in the embodiments of the related methods and will not be elaborated herein.

Figure 14:
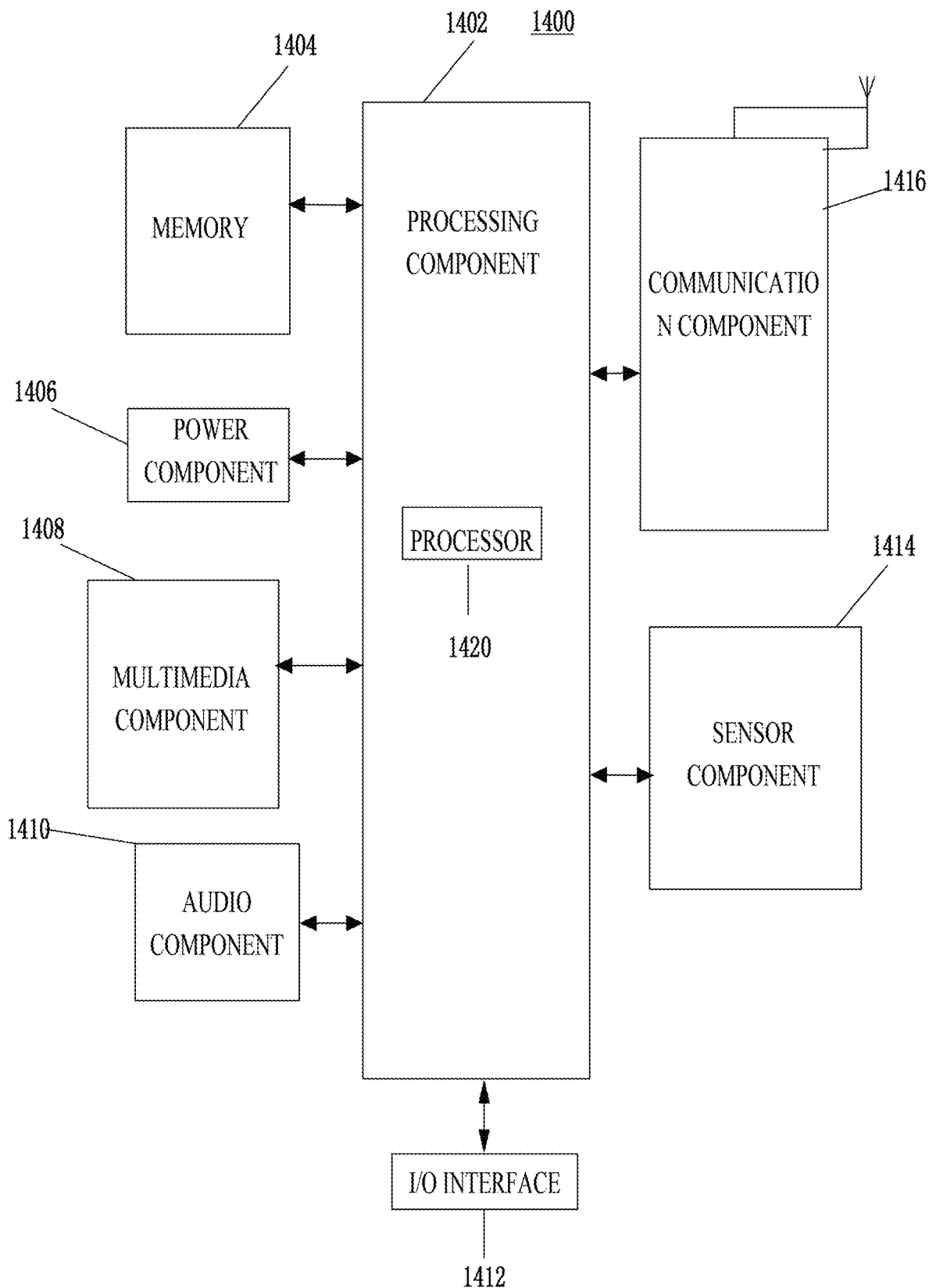
FIG. 14 is a block diagram of an information retrieval apparatus according to an exemplary embodiment.

FIG. 14 is a block diagram of an information retrieval apparatus according to an exemplary embodiment. For example, the apparatus 1400 may be an electronic device such as a mobile phone with a camera, a computer, a digital broadcast terminal, a messaging device, a gaming console, a tablet, a medical device, exercise equipment, a personal digital assistant or the like.

Referring to FIG. 14, the apparatus 1400 may include one or more of the following components: a processing component 1402, a memory 1404, a power component 1406, a multimedia component 1408, an audio component 1410, an input/output (I/O) interface 1412, a sensor component 1414 and a communication component 1416.

The processing component 1402 generally controls the overall operations of the apparatus 1400, for example, display, phone call, data communication, camera operation and recording operation. The processing component 1402 may include one or more processors 1420 to execute instructions to perform all or part of the steps in the above described methods. In addition, the processing component 1402 may include one or more modules to facilitate the interaction between the processing component 1402 and other components. For example, the processing component 1402 may include a multimedia module to facilitate the interaction between the multimedia component 1408 and the processing component 1402.

The memory 1404 is configured to store various types of data to support the operation performed on the apparatus 1400. Examples of such data include instructions for any applications or methods operated on the apparatus 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the apparatus 1400. The power component 1406 may include a power supply management system, one or more power sources, and any other components associated with the generation, management, and distribution of power in the apparatus 1400.

The multimedia component 1408 includes a screen providing an output interface between the apparatus 1400 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and the rear camera may receive external multimedia data while the apparatus 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone ("MIC") configured to receive an external audio signal when the apparatus 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the apparatus 1400. For instance, the sensor component 1414 may detect an open/closed status of the apparatus 1400, relative positioning of components, e.g., the display and the keypad, of the apparatus 1400, a change in position of the apparatus 1400 or a component of the apparatus 1400, a presence or absence of user contact with the apparatus 1400, an orientation or an acceleration/deceleration of the apparatus 1400, and a change in temperature of the apparatus 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, a microwave sensor or a temperature sensor.

The communication component 1416 is configured to facilitate wired or wireless communication between the apparatus 1400 and other devices. The apparatus 1400 can access a wireless network based on a communication standard, such as WiFi, 2G or 3G or a combination thereof. In one exemplary embodiment, the communication component 1416 receives a broadcast signal or broadcast related information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1400 may be implemented with one or more application specific integrated circuits (ASIC), digital signal processors (DSP), digital signal processing devices (DSPD), programmable logic devices (PLD), field programmable gate arrays (FPGA), controllers, micro-controllers, microprocessors, or other electronic components, for performing the above information retrieval method.

The method comprises: sending at least one keyword in chatting contents in an input box to a server, when it is detected that the chatting contents need to be sent to a communication counterpart; receiving, from the server based on the at least one keyword, retrieved contents and at least one category in which the retrieved contents are categorically stored in the server; and categorically displaying the retrieved contents in a current interface, in accordance with the at least one category.

In an exemplary embodiment, there is also provided a non-transitory computer-readable storage medium including instructions, such as included in the memory 1404, executable by the processor 1420 of the apparatus 1400, for performing the above-described methods. For example, the non-transitory computer-readable storage medium may be a ROM, a RAM, a CD-ROM, a magnetic tape, a floppy disc, an optical data storage device, and the like.

The processor 1420 is configured to: send at least one keyword in chatting contents in an input box to a server, when it is detected that the chatting contents need to be sent to a communication counterpart; receive, from the server based on the at least one keyword, retrieved contents and at least one category in which the retrieved contents are categorically stored in the server; and categorically display the retrieved contents in a current interface, in accordance with the at least one category.

Figure 15:
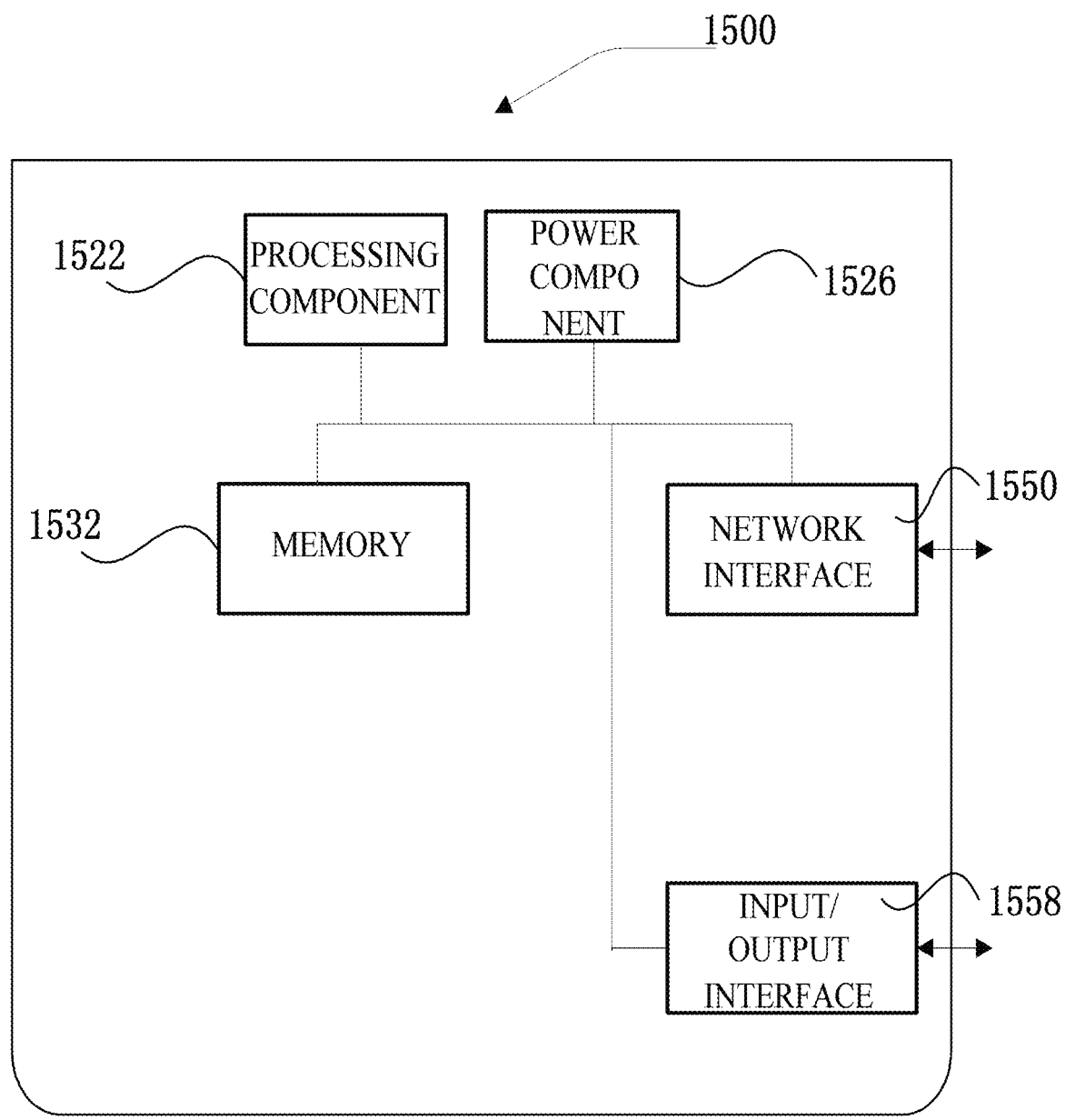
FIG. 15 is a block diagram of another information retrieval apparatus according to an exemplary embodiment.

FIG. 15 is a block diagram suitable for an information retrieval apparatus according to an exemplary embodiment. For example, the apparatus 1500 can be provided as e.g., a server which may correspond to multiple database servers. Referring to FIG. 15, the apparatus 1500 includes: a processing component 1522, which further includes one or more processors; and storage resources represented by a memory 1532, for storing instructions, i.e., applications, executable by the processing component 1522. The applications stored in the memory 1532 may include one or more modules each corresponding to a set of instructions. Further, the processing component 1522 is configured to execute instructions to perform the above information retrieval method.

The method comprises: receiving at least one keyword from an electronic device, wherein the at least one keyword is identified from chatting contents in an input box by the electronic device when the electronic device detects that the chatting contents need to be sent to a communication counterpart; retrieving contents which match the at least one keyword, and determining at least one category in which the retrieved contents are categorically stored; and sending the retrieved contents and the at least one category to the electronic device.

The apparatus 1500 may further include: a power component 1526 configured to perform power management for the apparatus 1500, a wired or wireless network interface 1550 configured to connect the apparatus 1500 to a network, and an input/output (I/O) interface 1558. The apparatus 1500 can operate based on an operating system stored in the memory 1532, e.g., Windows Server™, MAC OS X™, Unix™, Linux™, FreeBSD™, or the like.

In an exemplary embodiment, there is also provided a non-transitory computer-readable storage medium including instructions, such as included in the memory 1532, executable by the processing component 1522 of the apparatus 1500, for performing the above-described methods. For example, the non-transitory computer-readable storage medium may be a ROM, a RAM, a CD-ROM, a magnetic tape, a floppy disc, an optical data storage device, and the like.

When executed by the processor of a mobile terminal/server, the instructions in the non-transitory computer-readable storage medium cause the mobile terminal/server to perform an information retrieval method. The method comprises: receiving at least one keyword from an electronic device, wherein the at least one keyword is identified from chatting contents in an input box by the electronic device when the electronic device detects that the chatting contents need to be sent to a communication counterpart; retrieving contents which match the at least one keyword, and determining at least one category in which the retrieved contents are categorically stored; and sending the retrieved contents and the at least one category to the electronic device.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the appended claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An information retrieval method, implemented by an electronic device, the method comprising:
   identifying at least one keyword in chatting contents in an input box of an instant messenger, when it is detected that the chatting contents need to be sent to a communication counterpart;
   sending the at least one keyword to a server;
   receiving, from the server based on the at least one keyword, retrieved contents and at least one category in which the retrieved contents are categorically stored in the server; and
   categorically displaying the retrieved contents in a current interface, in accordance with the at least one category,
   wherein identifying the at least one keyword in the chatting contents in the input box of the instant messenger comprises:
      when it is detected that there are chatting contents entered in the input box of the instant messenger, before the chatting contents in the input box are submitted, identifying textual information in the chatting contents to acquire the at least one keyword in the chatting contents, and
   wherein categorically displaying the retrieved contents in the current interface in accordance with the at least one category comprises:
      acquiring a latest action keyword in a chatting record or in the chatting contents, when the at least one category is received from the server;
      determining a displaying order of the at least one received category based on the latest action keyword; and
      displaying, in the displaying order, the at least one category and the retrieved contents corresponding respectively to the at least one category.

2. The method according to claim 1, further comprising:
   detecting whether a trigger event for sharing of a retrieved content occurs in the current interface in which the retrieved contents are displayed categorically; and
   when it is detected that the trigger event for sharing of the retrieved content occurs, sending the retrieved content to be shared to the communication counterpart.

3. The method according to claim 1, wherein categorically displaying the retrieved contents in the current interface in accordance with the at least one category comprises:
   categorically displaying the retrieved contents in an inputting method interface in accordance with the at least one category.

4. The method according to claim 1, wherein categorically displaying the retrieved contents in the current interface in accordance with the at least one category comprises:
   categorically displaying the retrieved contents in a chatting interface in accordance with the at least one category.

5. The method according to claim 1, further comprising:
   determining the displaying order of the at least one category according to a preset displaying order, if it fails to acquire the latest action keyword in the chatting record or in the chatting contents.

6. The method according to claim 1, wherein determining the displaying order of the at least one received category based on the latest action keyword comprises:
   determining a matching degree between the latest action keyword and each of the at least one category to acquire at least one matching result;
   determining the displaying order of the at least one category, in accordance with a descending order of the at least one matching result; and
   if the at least one matching result indicates that multiple categories have the same matching degree, determining a displaying order of the multiple categories with the same matching degree in the current interface according to a preset order.

7. The method according to claim 1, further comprising:
   when it is detected that the chatting contents in the input box to be sent to the communication counterpart include an image, sending the image as the at least one keyword to the server.

8. The method according to claim 1, further comprising:
   when it is detected that the chatting contents in the input box to be sent to the communication counterpart include an image, identifying key information of the image; and
   sending the identified key information of the image as the at least one keyword to the server.

9. An electronic device, comprising:
   a processor; and
   a memory storing instructions executable by the processor,
   wherein the processor is configured to:
   identify at least one keyword in chatting contents in an input box of an instant messenger, when it is detected that the chatting contents need to be sent to a communication counterpart;
   send the at least one keyword to a server;
   receive, from the server based on the at least one keyword, retrieved contents and at least one category in which the retrieved contents are categorically stored in the server; and
   categorically display the retrieved contents in a current interface, in accordance with the at least one category,
   wherein the processor configured to identify the at least one keyword in the chatting contents in the input box of the instant messenger is further configured to:
      when it is detected that there are chatting contents entered in the input box of the instant messenger, before the chatting contents in the input box are submitted, identify textual information in the chatting contents to acquire at least one keyword in the chatting contents, and
   wherein the processor configured to categorically display the retrieved contents in the current interface in accordance with the at least one category is further configured to:
      acquire a latest action keyword in a chatting record or in the chatting contents, when the at least one category is received from the server;
      determine a displaying order of the at least one received category based on the latest action keyword; and display, in the displaying order, the at least one category and the retrieved contents corresponding respectively to the at least one category.

10. The electronic device according to claim 9, wherein the processor is further configured to:
   detect whether a trigger event for sharing of a retrieved content occurs in the current interface in which the retrieved contents are displayed categorically; and
   when it is detected that the trigger event for sharing of the retrieved content occurs, send the retrieved content to be shared to the communication counterpart.

11. The electronic device according to claim 9, wherein the processor configured to categorically display the retrieved contents in the current interface in accordance with the at least one category is further configured to:
   categorically display the retrieved contents in an inputting method interface in accordance with the at least one category.

12. The electronic device according to claim 9, wherein the processor configured to categorically display the retrieved contents in the current interface in accordance with the at least one category is further configured to:
   categorically display the retrieved contents in a chatting interface in accordance with the at least one category.

13. The electronic device according to claim 9, wherein the processor is further configured to:
   determine the displaying order of the at least one category according to a preset displaying order, if it fails to acquire the latest action keyword in the chatting record or in the chatting contents.

14. The electronic device according to claim 9, wherein the processor configured to determine the displaying order of the at least one received category based on the latest action keyword is further configured to:
   determine a matching degree between the latest action keyword and each of the at least one category to acquire at least one matching result;
   determine the displaying order of the at least one category, in accordance with a descending order of the at least one matching result; and
   if the at least one matching result indicates that multiple categories have the same matching degree, determine a displaying order of the multiple categories with the same matching degree in the current interface according to a preset order.

15. The electronic device according to claim 9, wherein the processor is further configured to:
   when it is detected that the chatting contents in the input box to be sent to the communication counterpart include an image, send the image as the at least one keyword to the server.

16. A non-transitory computer-readable storage medium having stored therein instructions that, when executed by a processor of a mobile terminal, cause the mobile terminal to perform an information retrieval method, the method comprising:
   identifying at least one keyword in chatting contents in an input box of an instant messenger, when it is detected that the chatting contents need to be sent to a communication counterpart;
   sending the at least one keyword to a server;
   receiving, from the server based on the at least one keyword, retrieved contents and at least one category in which the retrieved contents are categorically stored in the server; and
   categorically displaying the retrieved contents in a current interface, in accordance with the at least one category,
   wherein identifying the at least one keyword in the chatting contents in the input box of the instant messenger comprises:
      when it is detected that there are chatting contents entered in the input box of the instant messenger, before the chatting contents in the input box are submitted, identifying textual information in the chatting contents to acquire the at least one keyword in the chatting contents, and
   wherein categorically displaying the retrieved contents in the current interface in accordance with the at least one category comprises:
      acquiring a latest action keyword in a chatting record or in the chatting contents, when the at least one category is received from the server;
      determining a displaying order of the at least one received category based on the latest action keyword; and
      displaying, in the displaying order, the at least one category and the retrieved contents corresponding respectively to the at least one category.

17. The method according to claim 1, wherein the latest action keyword is a preset verb.

18. The electronic device according to claim 9, wherein the latest action keyword is a preset verb.

* * * * *